US011595579B2

(12) United States Patent
Duran et al.

(10) Patent No.: US 11,595,579 B2
(45) Date of Patent: *Feb. 28, 2023

(54) SYSTEMS AND METHODS FOR AUTOMATIC EXPOSURE IN HIGH DYNAMIC RANGE VIDEO CAPTURE SYSTEMS

(71) Applicant: Google LLC, Mountain View, CA (US)

(72) Inventors: William Duran, Santa Cruz, CA (US); Adrian Proca, Santa Cruz, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/652,400

(22) Filed: Feb. 24, 2022

(65) Prior Publication Data
US 2022/0272262 A1 Aug. 25, 2022

Related U.S. Application Data

(63) Continuation of application No. 17/307,958, filed on May 4, 2021, now Pat. No. 11,297,234, which is a continuation of application No. 16/787,450, filed on Feb. 11, 2020, now Pat. No. 11,050,936, which is a
(Continued)

(51) Int. Cl.
H04N 5/232 (2006.01)
H04N 5/235 (2006.01)
H04N 5/243 (2006.01)
H04N 5/347 (2011.01)

(52) U.S. Cl.
CPC ....... *H04N 5/23245* (2013.01); *H04N 5/2351* (2013.01); *H04N 5/2352* (2013.01); *H04N 5/2353* (2013.01); *H04N 5/2355* (2013.01); *H04N 5/243* (2013.01); *H04N 5/347* (2013.01)

(58) Field of Classification Search
None
See application file for complete search history.

(56) References Cited

U.S. PATENT DOCUMENTS 9,711,553 B2 7/2017 Kim et al.
10,560,629 B2 2/2020 Duran et al.
10,630,901 B2 * 4/2020 Duran ................ H04N 5/23245
(Continued)

OTHER PUBLICATIONS

"Non-Final Office Action", U.S. Appl. No. 15/987,831, filed May 15, 2019, 17 pages.
(Continued)

*Primary Examiner* — Cynthia Segura
(74) *Attorney, Agent, or Firm* — Colby Nipper PLLC

(57) ABSTRACT

The various implementations described herein include methods, devices, and systems for implementing high dynamic range and automatic exposure functions in a video system. In one aspect, a method is performed at a video camera device and includes, while operating in a non-high dynamic range (HDR) mode: capturing first video data of a scene with the image sensor; determining whether a minimum number of pixels of the first video data meets one or more first color intensity criteria; and in accordance with the determination that the minimum number of pixels of the first video data meets the one or more first color intensity criteria, switching operation from the non-HDR mode to an HDR mode.

20 Claims, 18 Drawing Sheets
(2 of 18 Drawing Sheet(s) Filed in Color)

Related U.S. Application Data continuation of application No. 15/987,831, filed on May 23, 2018, now Pat. No. 10,560,629.

(60) Provisional application No. 62/510,241, filed on May 23, 2017.

(56) References Cited

U.S. PATENT DOCUMENTS

| | | | |
|---|---|---|---|
| 10,666,882 B2 | 5/2020 | Takane | |
| 10,911,674 B2* | 2/2021 | Duran | H04N 5/243 |
| 11,050,936 B2 | 6/2021 | Duran et al. | |
| 11,297,234 B2* | 4/2022 | Duran | H04N 5/2351 |
| 2006/0215739 A1 | 9/2006 | Williamson et al. | |
| 2009/0091645 A1 | 4/2009 | Trimeche et al. | |
| 2010/0013983 A1 | 1/2010 | Ward et al. | |
| 2010/0073513 A1* | 3/2010 | Tanaka | H04N 5/235 348/E5.037 |
| 2012/0020556 A1 | 1/2012 | Manabe | |
| 2012/0105672 A1 | 5/2012 | Doepke et al. | |
| 2014/0375815 A1 | 12/2014 | Kanou et al. | |
| 2015/0350512 A1 | 12/2015 | Chen et al. | |
| 2016/0050354 A1 | 2/2016 | Musatenko et al. | |
| 2016/0057332 A1 | 2/2016 | Ciurea et al. | |
| 2016/0057333 A1 | 2/2016 | Liu | |
| 2017/0064179 A1 | 3/2017 | Richards | |
| 2017/0091566 A1 | 3/2017 | Kasaoki et al. | |
| 2017/0095297 A1 | 4/2017 | Richmond et al. | |
| 2018/0041724 A1* | 2/2018 | Kim | H04N 5/355 |
| 2018/0048829 A1 | 2/2018 | Chan | |
| 2018/0089799 A1 | 3/2018 | Johnson et al. | |
| 2018/0288301 A1 | 10/2018 | Fu et al. | |
| 2018/0343375 A1 | 11/2018 | Duran et al. | |
| 2018/0343390 A1 | 11/2018 | Duran et al. | |
| 2018/0367721 A1* | 12/2018 | Fukazawa | H04N 5/2352 |
| 2020/0045227 A1 | 2/2020 | Jiang et al. | |
| 2020/0177811 A1 | 6/2020 | Duran et al. | |
| 2020/0177812 A1 | 6/2020 | Duran et al. | |
| 2021/0258487 A1 | 8/2021 | Duran et al. | |
| 2021/0337117 A1 | 10/2021 | Cai et al. | |

OTHER PUBLICATIONS

"Non-Final Office Action", U.S. Appl. No. 16/787,970, filed Jul. 1, 2020, 13 pages.

"Non-Final Office Action", U.S. Appl. No. 16/787,450, filed Oct. 1, 2020, 29 pages.

"Non-Final Office Action", U.S. Appl. No. 17/307,958, filed Oct. 4, 2021, 11 pages.

"Notice of Allowance", U.S. Appl. No. 16/787,450, filed Mar. 8, 2021, 10 pages.

"Notice of Allowance", U.S. Appl. No. 15/987,831, filed Sep. 6, 2019, 10 pages.

"Notice of Allowance", U.S. Appl. No. 16/787,970, filed Oct. 15, 2020, 8 pages.

"Notice of Allowance", U.S. Appl. No. 15/987,835, filed Nov. 13, 2019, 11 pages.

"Notice of Allowance", U.S. Appl. No. 17/307,958, filed Nov. 30, 2021, 8 pages.

"Pre-Interview First Office Action", U.S. Appl. No. 15/987,835, filed Sep. 20, 2019, 3 pages.

\* cited by examiner

SYSTEMS AND METHODS FOR AUTOMATIC EXPOSURE IN HIGH DYNAMIC RANGE VIDEO CAPTURE SYSTEMS

PRIORITY AND RELATED APPLICATIONS

This application is a continuation of U.S. patent application Ser. No. 17/307,958, filed May 4, 2021, which is a continuation of U.S. patent application Ser. No. 16/787,450, filed Feb. 11, 2020, now U.S. Pat. No. 11,050,936, which is a continuation of U.S. patent application Ser. No. 15/987,831, filed May 23, 2018, now U.S. Pat. No. 10,560,629, which claims priority to U.S. Provisional Application No. 62/510,241, filed May 23, 2017, the disclosures of which are incorporated herein by reference.

This application is related to U.S. patent application Ser. No. 15/987,835, filed May 23, 2018, which is hereby incorporated by reference in its entirety.

TECHNICAL FIELD

This relates generally to video camera devices, including but not limited to, auto exposure and high dynamic range in video camera devices.

BACKGROUND

In photography, exposure relates to an amount of light per unit area reaching a photographic film or image sensor. A camera in an automatic exposure (AE) mode automatically calculates and adjusts exposure settings.

High Dynamic Range (HDR) photo techniques are used to capture images in which the scene content has very bright and very low level light regions, sometimes called a high dynamic range scene. A high dynamic range scene presents problems for standard imaging systems because the exposure value (combination of exposure time and gain) is fixed for the entire frame.

SUMMARY

Accordingly, there is a need for systems and/or devices with more efficient and accurate methods for implementing high dynamic range and automatic exposure functions in a video system. Such systems, devices, and methods optionally complement or replace conventional systems, devices, and methods for high dynamic range and automatic exposure functions.

HDR mode yields better image quality in high dynamic range scenes with a wide variety of lighting conditions. However, it comes at a price. As will be discussed in greater detail below, the amount of image data that must be captured is generally doubled in HDR mode and there is considerable compute power required to do the fusion, both of which impact power consumption and raise the thermal load on the video system. Thus, intelligently switching into and out of HDR mode automatically in order to minimize power and thermal impact is desirable in many video systems.

In one aspect, some implementations include a method that is performed at a video camera device having memory, one or more processors, and an image sensor. The method includes, while operating in a high dynamic range mode: (1) capturing video data of a scene in a field of view of the image sensor, including: (a) capturing a first subset of the video data with a first exposure time; and (b) capturing a second subset of the video data with a second exposure time, lower than the first exposure time; (2) determining whether the first subset of the video data meets one or more first predefined criteria; (3) determining whether the second subset of the video data meets one or more second predefined criteria; (4) in accordance with a determination that the first subset meets the one or more first predefined criteria or a determination that the second subset meets the one or more second predefined criteria, switching operation from the HDR mode to a non-HDR mode.

In another aspect, some implementations include a method performed at a video camera device having memory, one or more processors, and an image sensor. The method includes: (1) while operating in a high dynamic range mode, capturing video data of a scene in a field of view of the image sensor, including: (a) capturing a first subset of the video data with a first exposure time; and (b) capturing a second subset of the video data with a second exposure time, lower than the first exposure time; (2) combining first video data of the first subset of video data with second video data of the second subset of video data to generate an HDR frame; and (3) adjusting a duration of at least one of the first exposure time and the second exposure time based on one or more parameters of the captured video data, thereby altering a ratio of the first exposure time to the second exposure time.

In another aspect, some implementations include a non-transitory computer-readable storage medium storing one or more programs, the one or more programs comprising instructions which, when executed by a camera device with one or more processors, memory, and an image sensor, cause the camera device to perform any of the methods described herein.

In another aspect, some implementations include a camera device with one or more processors, memory, and an image sensor configured to perform any of the methods described herein.

Thus, devices are provided with more efficient, effective, and accurate methods for implementing high dynamic range and automatic exposure functions in a video system. Such systems, devices, and methods optionally complement or replace conventional systems, devices, and methods for high dynamic range and automatic exposure functions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DETAILED DESCRIPTION

Operating a camera device in an HDR mode has some drawbacks. For example, the sensor needs to deliver image data at twice the recorded data rate, which increases power consumption. Increased power consumption may result in thermal dissipation challenges for the image sensor since image quality performance tends to degrade as the sensor's temperature increases. Thus, it is desirable to operate in an HDR mode only when a high dynamic range scene is present so as to reduce power consumption and thermal heating.

In some implementations, a security camera captures surveillance video using a digital imaging system. In some implementations, the digital images (also sometimes called frames) are captured as a sequence at a particular frame rate. In some implementations, the images are then compressed and sent to a server system (e.g., the "cloud") for storage and retrieval. Each frame is composed of X by Y pixels depending on the resolution and, in some implementations, each pixel location has 3 color components: red, green and blue. In some implementations, frame statistics are gathered about each of the 3 color components (e.g., as a corresponding frame is captured). In some implementations, an average light intensity ("Luma" value) is calculated. In various situations and implementations, a number of factors impact the average Luma value for a particular frame, such as lighting conditions in the scene, distance from the camera to the scene, and reflectivity of objects within the scene. In some situations, these factors are part of the environment the user wishes to monitor and cannot be controlled by user.

In some implementations, there are a number of controls within the camera system that have an impact on the average Luma value and can be adjusted to move the average Luma value toward a particular target. For example, the controls optionally include one or more of: shutter speed, analog gain, digital gain, and frame rate. In some implementations, the controls are adjusted as part of an automatic exposure (AE) process in the camera system.

In some implementations, a camera device utilizes an auto exposure process optimized for use with staggered HDR techniques. In some implementations, the auto exposure process does one or more of the following: uses fixed exposure ratio in order to simplify Local Tone Mapping, determines optimal point in the pipeline at which to gather statistics; determines optimal scenarios to switch into and out of HDR mode; and calculates exposure, gain, and framerate for best image quality using HDR.

Figure 1:
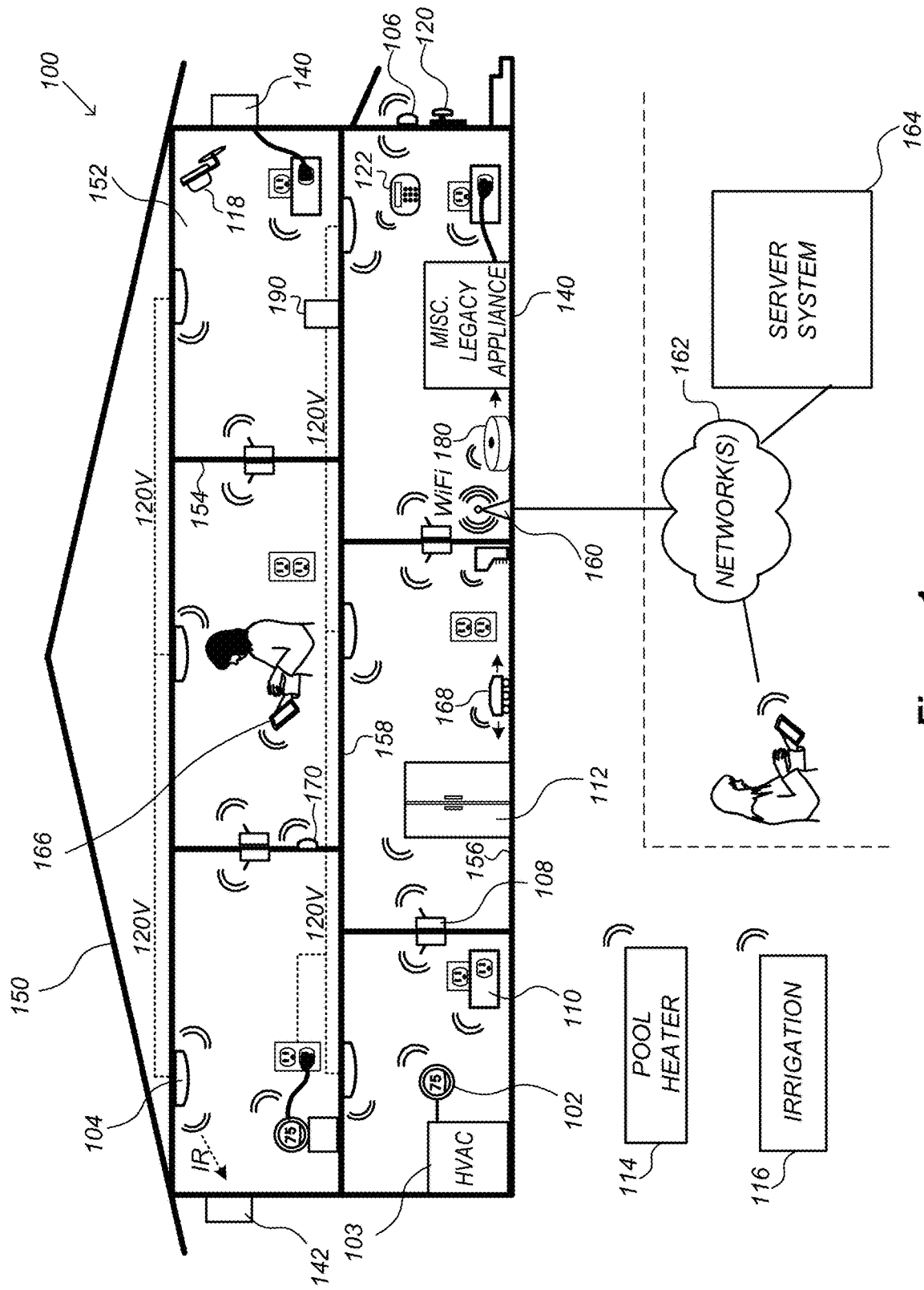
FIG. 1 is an example smart home environment in accordance with some implementations.

Turning now to the figures, FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or workspace.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2A) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 detects a person's approach to or departure from a location (e.g., an outer door), control doorbell/door locking functionality (e.g., receive user inputs from a portable electronic device 166 to actuate bolt of the smart door lock 120), announce a person's approach or departure via audio or visual means, and/or control settings on a security system (e.g., to activate or deactivate the security system when occupants go and come). In some implementations, the smart doorbell 106 and/or the smart lock 120 are battery-powered (e.g., are not line-powered). In some implementations, the smart doorbell 106 includes some or all of the components and features of the camera 118. In some implementations, the smart doorbell 106 includes a camera 118. In some implementations, the smart doorbell 106 includes a camera 118 that is embedded in the doorbell 106. In some implementations, the smart doorbell 106 includes a camera that is mounted on or near the doorbell 106. In some implementations, the smart doorbell 106 includes a camera 118 that is not mounted in, on, or near the doorbell 106, but is instead mounted in proximity to the doorbell 106. In some implementations, the smart doorbell 106 includes two or more cameras 118 (e.g., one camera facing the entryway, and another camera facing approaching visitors). In some implementations, the smart doorbell 106 has a camera (also sometimes referred to herein as doorbell camera 106) which is separate from a video camera 118. For the purposes of this disclosure, video-related references to doorbell 106 refer to one or more cameras associated with doorbell 106.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 detect ambient lighting conditions, detect room-occupancy states, and/or control a power and/or dim state of one or more lights. In some instances, smart wall switches 108 also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. In some implementations, the cameras 118 are battery-powered (e.g., are not line-powered). In some implementations, as described in more detail below, the cameras 118 are configured to selectively couple to one or more networks and/or selectively capture, store, transmit video data (e.g., based on presence and characterization of motion within the field of view). In some implementations, in the low power mode, a camera 118 detects an approaching visitor using a low power sensor, such as a PIR sensor, which is always on or periodically on.

In some implementations, the cameras 118 are used to determine occupancy of the structure 150 and/or particular rooms 152 in the structure 150, and thus act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 are each configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

In some implementations, the smart home environment 100 includes one or more network-connected doorbells 106 that are configured to provide video monitoring and security in a vicinity of an entryway of the smart home environment 100. The doorbells 106 are optionally used to determine the approach and/or presence of a visitor. Specific individuals are optionally identified based, for example, on their appearance (e.g., height, face) and/or movement (e.g., their walk/gait). A doorbell 106 optionally includes one or more sensors (e.g., IR sensors, motion detectors), input devices (e.g., microphone for capturing audio), and output devices (e.g., speaker for outputting audio). In some implementations, a doorbell 106 is configured to operate in a high-light mode (e.g., a day mode) and in a low-light mode (e.g., a night mode). In some implementations, a doorbell 106 includes one or more IR illuminators for providing illumination while the camera is operating in the low-light mode. In some implementations, a doorbell 106 includes one or more lights (e.g., one or more LEDs) for illuminating the doorbell in low-light conditions and/or giving visual feedback to a visitor. In some implementations, a doorbell 106 includes additional features and/or components such as weatherproofing and/or solar ray compensation. In some implementations, doorbell 106 is battery powered and runs in a low power or a high power mode. In some implementations, in the low power mode, doorbell 106 detects an approaching visitor using a low power sensor such as a PIR sensor which is always on or periodically on. In some implementations, after the visitor approach is detected, doorbell 106 switches to the high power mode to carry out further processing functions (described below).

In some implementations, the smart home environment 100 additionally or alternatively includes one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, the smart home environment 100 includes one or more devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, the devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a server system 164 (also called a central server system and/or a cloud-computing system herein). The server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

In some implementations, smart home environment 100 includes a local storage device 190 for storing data related to, or output by, smart devices of smart home environment 100. In some implementations, the data includes one or more of: video data output by a camera device (e.g., a camera included with doorbell 106), metadata output by a smart device, settings information for a smart device, usage logs for a smart device, and the like. In some implementations, local storage device 190 is communicatively coupled to one or more smart devices via a smart home network (e.g., smart home network 202, FIG. 2A). In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of the camera included with doorbell 106 exceeds the available bandwidth of the external network (e.g., network(s) 162). In some implementations, local storage device 190 temporarily stores video data from one or more doorbells (e.g., doorbell 106) prior to transferring the video data to a server system (e.g., server system 164).

Figure 2A:
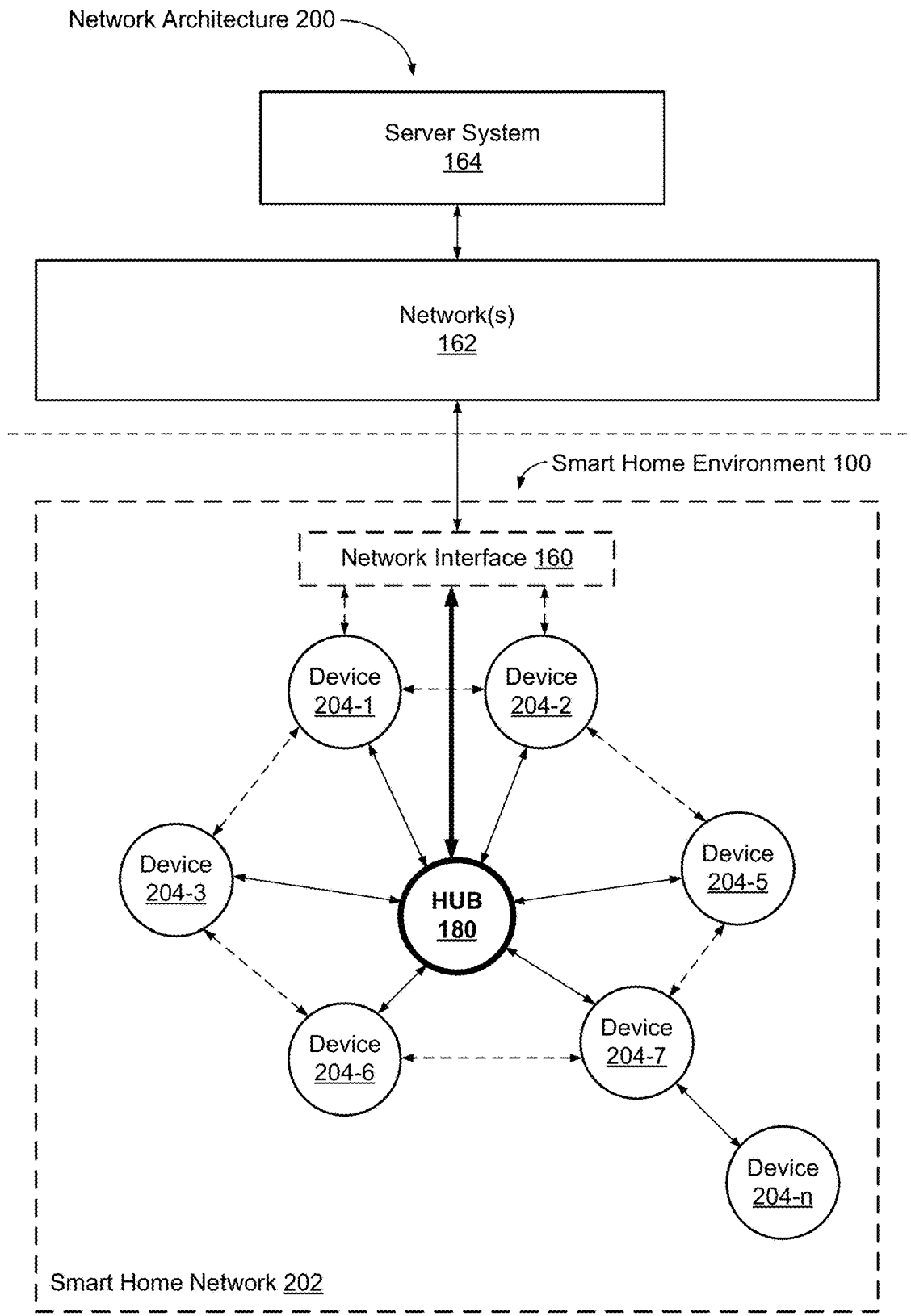
FIG. 2A is a block diagram illustrating a representative network architecture that includes a smart home network in accordance with some implementations.

FIG. 2A is a block diagram illustrating a representative network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, the hub device 180 operates as the smart home controller. In some implementations, a smart home controller has more computing power than other smart devices. In some implementations, a smart home controller processes inputs (e.g., from smart devices 204, electronic device 166, and/or server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 202, as well as over the Internet 162 to the server system 164. In some implementations, the mesh network enables the server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the server system 164 may communicate control commands to the low-powered nodes. For example, a user may use the electronic device 166 (e.g., a smart phone) to send commands over the Internet to the server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the server system 164.

Other examples of low-power nodes include battery-powered versions of the smart hazard detectors 104, cameras 118, doorbells 106, and the like. These battery-powered smart devices are often located in an area without access to constant and reliable power and optionally include any number and type of sensors, such as image sensor(s), occupancy/motion sensors, ambient light sensors, ambient temperature sensors, humidity sensors, smoke/fire/heat sensors (e.g., thermal radiation sensors), carbon monoxide/dioxide sensors, and the like. Furthermore, battery-powered smart devices may send messages that correspond to each of the respective sensors to the other devices and/or the server system 164, such as by using the mesh network as described above.

Examples of spokesman nodes include line-powered smart doorbells 106, smart thermostats 102, smart wall switches 108, and smart wall plugs 110. These devices are located near, and connected to, a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2B:
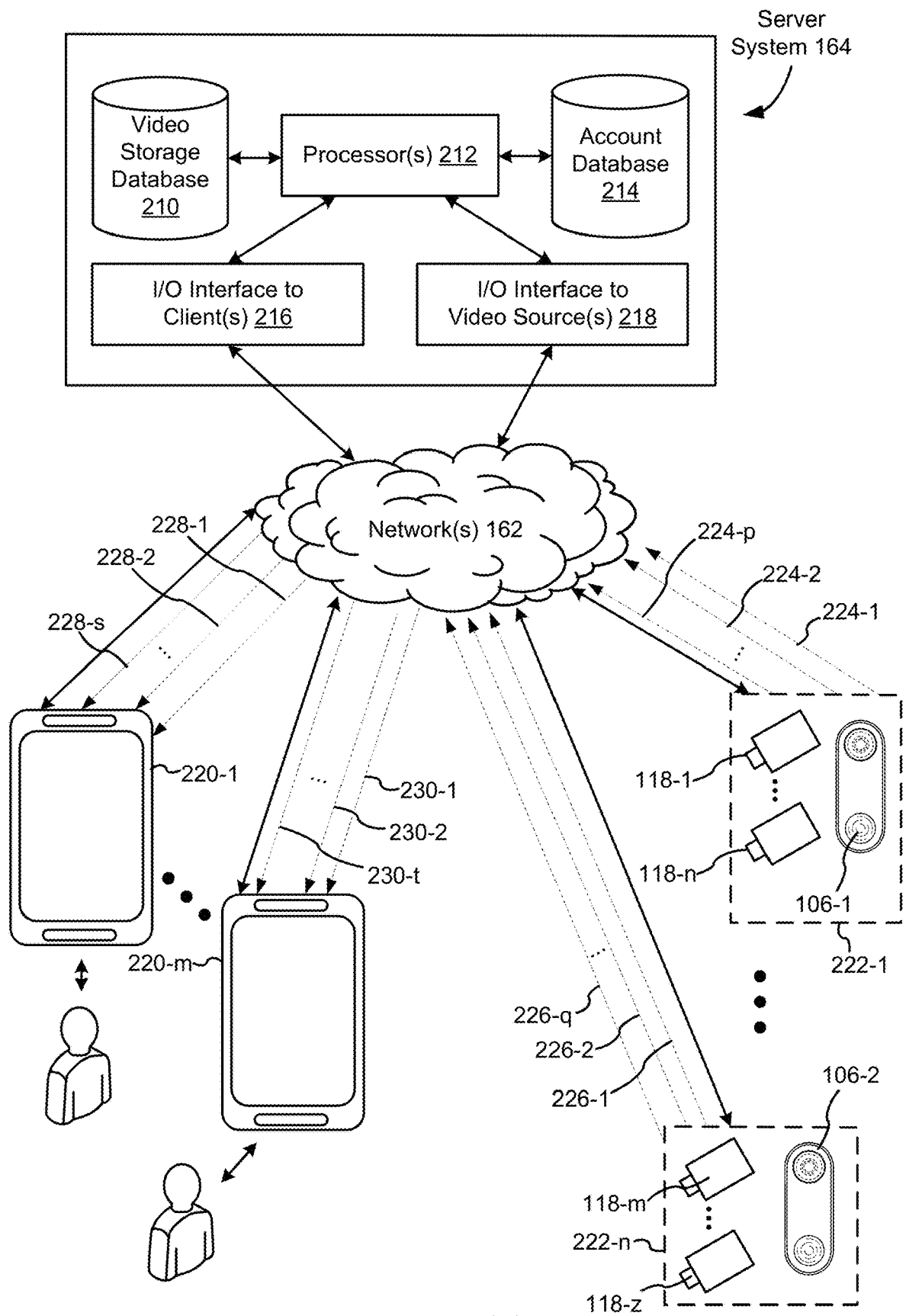
FIG. 2B is a representative operating environment in which a server system interacts with client devices and smart devices in accordance with some implementations.

FIG. 2B illustrates a representative operating environment in which a server system 164 provides data processing for monitoring and facilitating review of events (e.g., motion, audio, security, etc.) from data captured by the smart devices 204, such as video cameras 118 or doorbell cameras 106. As shown in FIG. 2B, the server system 164 receives data from video sources 222 (including cameras 118 and/or doorbell cameras 106) located at various physical locations (e.g., inside or in proximity to homes, restaurants, stores, streets, parking lots, and/or the smart home environments 100 of FIG. 1). In some implementations, the video source(s) 222 are linked to more than one reviewer account (e.g., multiple user accounts may be subscribed to a single smart home environment). In some implementations, the server system 164 provides video monitoring data for the video source 222 to client devices 220 associated with the reviewer accounts. For example, the portable electronic device 166 is an example of the client device 220. In some implementations, the server system 164 comprises a video processing server that provides video processing services to the video sources and client devices 220. In some implementations, the server system 164 receives non-video data from one or more smart devices 204 (e.g., audio data, metadata, numerical data, etc.). In some implementations, the non-video data is analyzed to provide context for motion events detected by the video cameras 118 and/or doorbell cameras 106. In some implementations, the non-video data indicates that an audio event (e.g., detected by an audio device), security event (e.g., detected by a perimeter monitoring device), hazard event (e.g., detected by a hazard detector), medical event (e.g., detected by a health-monitoring device), or the like has occurred within a smart home environment 100.

In some implementations, multiple reviewer accounts are linked to a single smart home environment 100. For example, multiple occupants of a smart home environment 100 may have accounts liked to the smart home environment. In some implementations, each reviewer account is associated with a particular level of access. In some implementations, each reviewer account has personalized notification settings. In some implementations, a single reviewer account is linked to multiple smart home environments 100. For example, a person may own or occupy, or be assigned to review and/or govern, multiple smart home environments 100. In some implementations, the reviewer account has distinct levels of access and/or notification settings for each smart home environment.

In some implementations, each of the video sources 222 includes one or more video cameras 118 or doorbell cameras 106 that capture video and send the captured video to the server system 164 substantially in real-time. In some implementations, each of the video sources 222 includes one or more doorbell cameras 106 that capture video and send the captured video to the server system 164 in real-time (e.g., within 1 second, 10 seconds, 30 seconds, or 1 minute). In some implementations, each of the doorbells 106 include a video camera that captures video and sends the captured video to the server system 164 in real-time. In some implementations, a video source 222 includes a controller device (not shown) that serves as an intermediary between the one or more doorbells 106 and the server system 164. The controller device receives the video data from the one or more doorbells 106, optionally performs some preliminary processing on the video data, and sends the video data and/or the results of the preliminary processing to the server system 164 on behalf of the one or more doorbells 106 (e.g., in real-time). In some implementations, each camera has its own on-board processing capabilities to perform some preliminary processing on the captured video data before sending the video data (e.g., along with metadata obtained through the preliminary processing) to the controller device and/or the server system 164. In some implementations, one or more of the cameras is configured to optionally locally store the video data (e.g., for later transmission if requested by a user). In some implementations, a camera is configured to perform some processing of the captured video data, and, based on the processing, either send the video data in substantially real-time, store the video data locally, or disregard the video data.

Figure 6:
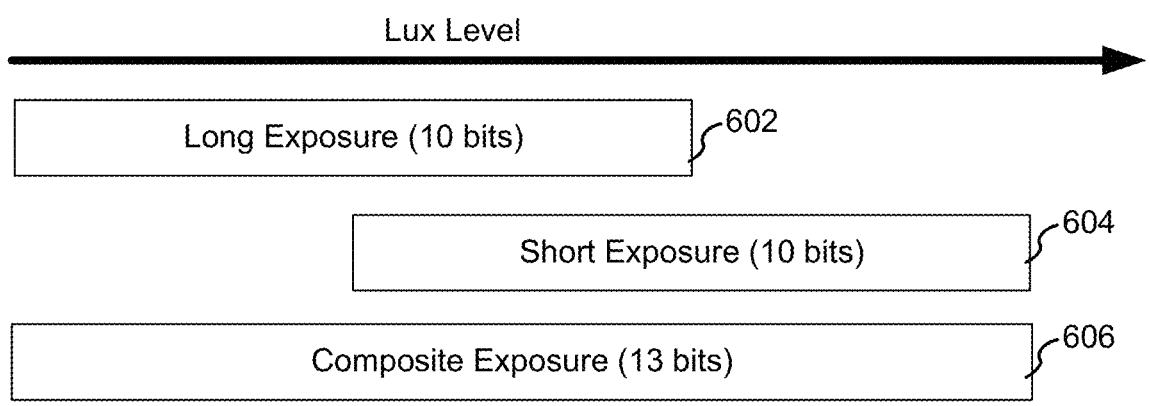
FIG. 6 is a block diagram illustrating a representative high dynamic range mode in accordance with some implementations.

In accordance with some implementations, a client device 220 includes a client-side module or smart home application, such as client-side module 628 in FIG. 6. In some implementations, the client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. In some implementations, the server-side module also provides server-side functionality for video processing and camera control for any number of the video sources 222, including any number of control devices, cameras 118, and doorbells 106.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 222 (e.g., groups of one or more doorbells 106, cameras 118, and associated controller devices). The video storage database 210 stores raw video data received from the video sources 222, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an eBook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a cloud server, a distributed cloud computing system, a handheld computer, a tablet computer, a laptop computer, a desktop computer, or a combination of any two or more of these data processing devices or other data processing devices.

In some implementations, a server-client environment includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects may be performed by the server system 164, a client device 220, and a video source 222 cooperatively.

In some implementations, a video source 222 (e.g., a camera 118 or doorbell 106 having an image sensor) transmits one or more streams of video data to the server system 164. In some implementations, the one or more streams include multiple streams, of respective resolutions and/or frame rates, of the raw video captured by the image sensor. In some implementations, the multiple streams include a "primary" stream (e.g., 226-1) with a certain resolution and frame rate (e.g., corresponding to the raw video captured by the image sensor), and one or more additional streams (e.g., 226-2 through 226-$q$). An additional stream is optionally the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream. In some implementations, the primary stream and/or the additional streams are dynamically encoded (e.g., based on network conditions, server operating conditions, camera operating conditions, characterization of data in the stream (e.g., whether motion is present), user preferences, and the like.

In some implementations, one or more of the streams 226 is sent from the video source 222 directly to a client device 220 (e.g., without being routed to, or processed by, the server system 164). In some implementations, one or more of the streams is stored at the doorbell 106 (e.g., in memory 406, FIG. 4) and/or a local storage device 190 (e.g., a dedicated recording device), such as a digital video recorder (DVR). For example, in accordance with some implementations, the doorbell 106 stores the most recent 24 hours of video footage recorded by the camera. As another example, in accordance with some implementations, the doorbell 106 stores up to 24 hours of video footage recorded by the camera (e.g., up to 24 hours of motion event data). In some implementations, portions of the one or more streams are stored at the doorbell 106 and/or the local storage device 109 (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream.

Figure 2C:
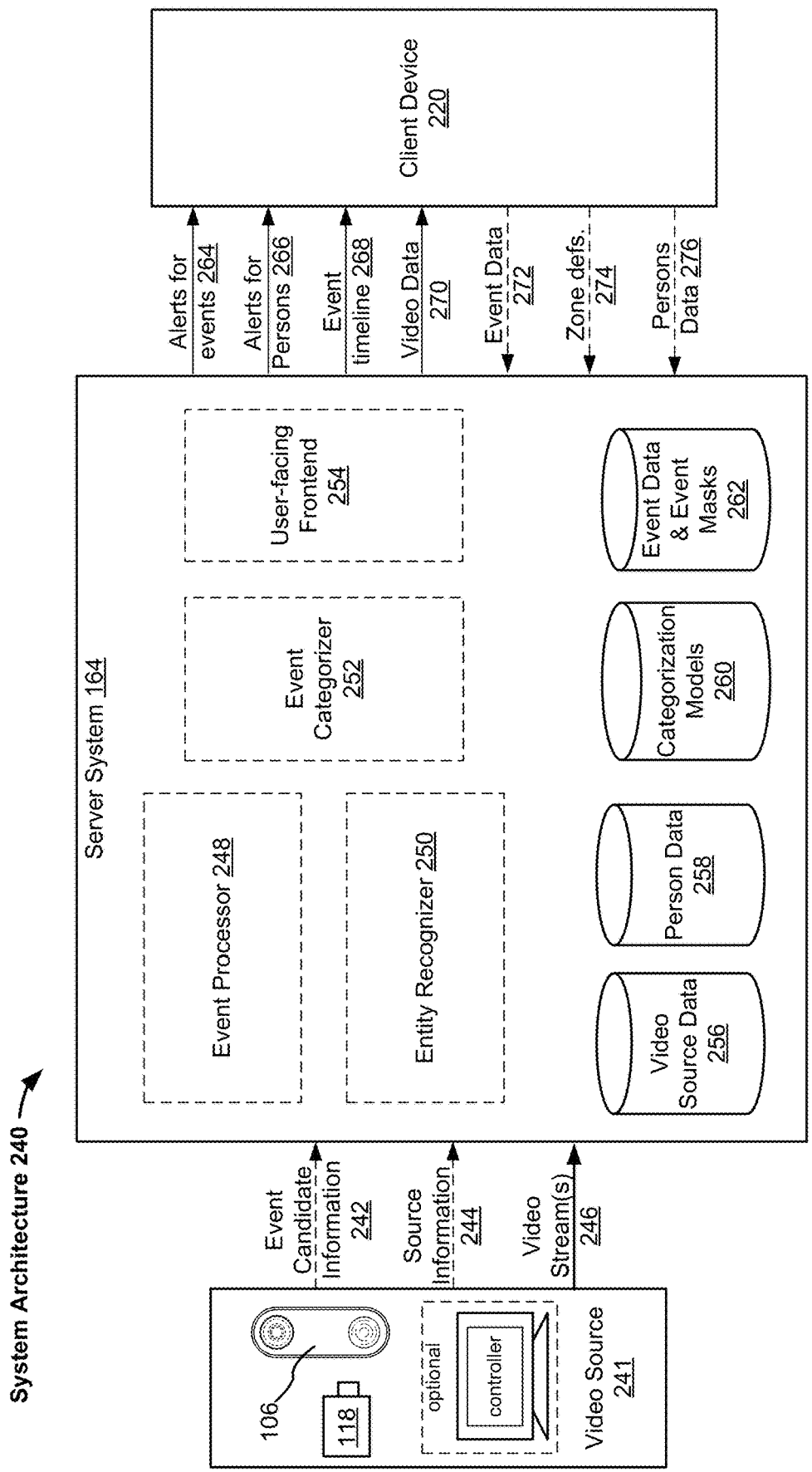
FIG. 2C illustrates representative system architecture for event analysis and categorization in accordance with some implementations.

FIG. 2C illustrates a representative system architecture 240 including video source(s) 241, server system 164, and client device(s) 220 in accordance with some implementations. In some implementations, the server system 164 includes functional modules for an event processor 248, an event categorizer 252, an entity recognizer 250, and a user-facing frontend 254. The event processor 248 obtains the event candidates (e.g., by processing the video stream(s) 246 or by receiving event start information from the video source 241, or by detecting a user press on a doorbell button of a doorbell camera). In some implementations, the event candidates comprise motion event candidates. In some implementations, the event candidates comprise audio event candidates. In some implementations, the event candidates include a user press on a doorbell button of a doorbell camera. In some implementations, the event candidates include audio, electromagnetic, olfactory, and/or visual aspects. In some implementations, the event candidates include motion events, approach detections, and announcement detections. The event categorizer 252 categorizes the event candidates into different event categories (e.g., based on data from the event processor and/or the entity recognizer). The user-facing frontend 254 generates event alerts and notifications, and facilitates review of the detected entities and events by a reviewer through a review interface on a client device 220. The user-facing frontend 254 also receives user edits on the event and entity categories, user preferences for alerts and event filters, zone definitions for zones of interest, and the like. The event categorizer optionally revises event categorization models and results based on the user edits received by the user-facing frontend. The entity recognizer optionally revises entity classifications and/or labels based on the user edits received by the user-facing frontend. In some implementations, the server system 164 also includes a video source data database 256, person data 258, event categorization models database 260, and event data and event masks database 262. In some implementations, the person data 258 includes a person's database. In some implementations, each of these databases is part of the server database 328 (e.g., part of data storage database 330).

The server system 164 receives one or more video stream(s) 246 from the video source 241 (e.g., a video source 222 from FIG. 2B) and optionally receives event candidate information 242, such as preliminary characterization information for detected entities and events (e.g., entity and event metadata from processing performed at the doorbell 106), and source information 244 such as device settings for a doorbell 106. In some implementations, the event processor 248 communicates with the video source 241 and/or one or more other devices of the smart home environment, e.g., to request additional image data, audio data, and sensor data, such as high definition images or metadata for the video stream(s) 246. The server system sends alerts for events 264, alerts for detected persons 266, event timeline information 268, and/or video data 270 (e.g., still images or video clips corresponding to the detected persons and/or events) to the client device 220. In some implementations, the alerts 264 distinguish visitor approach events from other types of motion events. In some implementations, the alerts 264 distinguish motion events captured at a doorbell 106 from motion events captured by other smart devices (e.g., cameras 118). The server system 164 optionally receives user information from the client device 220, such as event information 272 (e.g., edits to event categories), and zone definitions 274, and persons data 276 (e.g., classification of detected persons).

A data processing pipeline processes video information (e.g., a live video feed) received from a video source 241 (e.g., including a doorbell 106 and an optional controller device) and/or audio information received from one or more smart devices in real-time (e.g., within 10 seconds, 30 seconds, or 2 minutes) to identify and categorize events occurring in the smart home environment, and sends real-time event alerts (e.g., within 10 seconds, 20 seconds, or 30 seconds) and/or a refreshed event timeline (e.g., within 30 seconds, 1 minute, or 3 minutes) to a client device 220 associated with a reviewer account for the smart home environment. The data processing pipeline also processes stored information (such as stored video feeds from a video source 241) to reevaluate and/or re-categorize events as necessary, such as when new information is obtained regarding the event and/or when new information is obtained regarding event categories (e.g., a new activity zone definition is obtained from the user).

After video and/or audio data is captured at a smart device, the data is processed to determine if any potential event candidates or persons are present. In some implementations, the data is initially processed at the smart device (e.g., video source 241, camera 118, or doorbell 106). Thus, in some implementations, the smart device sends event candidate information, such as event start information, to the server system 164. In some implementations, the data is processed at the server system 164 for event start detection. In some implementations, the video and/or audio data is stored on server system 164 (e.g., in video source database 256). In some implementations, the visual/audio data is stored on a server distinct from server system 164. In some implementations, after a motion start is detected, the relevant portion of the video stream is retrieved from storage (e.g., from video source database 256).

In some implementations, the event identification process includes segmenting the video stream into multiple segments then categorizing the event candidate within each segment. In some implementations, categorizing the event candidate includes an aggregation of background factors, entity detection and identification, motion vector generation for each motion entity, entity features, and scene features to generate motion features for the event candidate. In some implementations, the event identification process further includes categorizing each segment, generating or updating an event log based on categorization of a segment, generating an alert for the event based on categorization of a segment, categorizing the complete event, updating the event log based on the complete event, and generating an alert for the event based on the complete event. In some implementations, a categorization is based on a determination that the event occurred within a particular zone of interest. In some implementations, a categorization is based on a determination that the event candidate involves one or more zones of interest. In some implementations, a categorization is based on audio data and/or audio event characterization.

The event analysis and categorization process may be performed by the smart device (e.g., the video source 241) and the server system 164 cooperatively, and the division of the tasks may vary in different implementations, for different equipment capability configurations, power parameters, and/or for different network, device, and server load situations. After the server system 164 categorizes the event candidate, the result of the event detection and categorization may be sent to a reviewer associated with the smart home environment.

In some implementations, the server system 164 stores raw or compressed video data (e.g., in a video source database 256), event categorization models (e.g., in an event categorization model database 260), and event masks and other event metadata (e.g., in an event data and event mask database 262) for each of the video sources 241. In some implementations, the video data is stored at one or more display resolutions such as 480p, 780p, 1080i, 1080p, and the like.

In some implementations, the video source 241 (e.g., the doorbell 106) transmits a live video feed to the remote server system 164 via one or more networks (e.g., the network(s) 162). In some implementations, the transmission of the video data is continuous as the video data is captured by the doorbell 106. In some implementations, the transmission of video data is irrespective of the content of the video data, and the video data is uploaded from the video source 241 to the server system 164 for storage irrespective of whether any motion event has been captured in the video data. In some implementations, the video data is stored at a local storage device of the video source 241 by default, and only video portions corresponding to motion event candidates detected in the video stream are uploaded to the server system 164 (e.g., in real-time or as requested by a user).

In some implementations, the video source 241 dynamically determines at what display resolution the video stream is to be uploaded to the server system 164. In some implementations, the video source 241 dynamically determines which parts of the video stream are to be uploaded to the server system 164. For example, in some implementations, depending on the current server load and network conditions, the video source 241 optionally prioritizes the uploading of video portions corresponding to newly detected motion event candidates ahead of other portions of the video stream that do not contain any motion event candidates; or the video source 241 uploads the video portions corresponding to newly detected motion event candidates at higher display resolutions than the other portions of the video stream. This upload prioritization helps to ensure that important motion events are detected and alerted to the reviewer in real-time, even when the network conditions and server load are less than optimal. In some implementations, the video source 241 implements two parallel upload connections, one for uploading the continuous video stream captured by the doorbell 106, and the other for uploading video portions corresponding to detected motion event candidates. At any given time, the video source 241 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 2C, the video source 241 optionally includes a video doorbell 106 and an optional controller device. In some implementations, the doorbell 106 includes sufficient on-board processing power to perform all necessary local video processing tasks (e.g., cuepoint detection for motion event candidates, video uploading prioritization, network connection management, etc.), and the doorbell 106 communicates with the server system 164 directly, without any controller device acting as an intermediary. In some implementations, the doorbell 106 captures the video data and sends the video data to the controller device for the necessary local video processing tasks. The controller device optionally performs the local processing tasks for multiple cameras. For example, there may be multiple cameras in one smart home environment (e.g., the smart home environment 100, FIG. 1), and a single controller device receives the video data from each camera and processes the video data to detect motion event candidates in the video stream from each camera. The controller device is responsible for allocating sufficient outgoing network bandwidth to transmitting video segments containing motion event candidates from each camera to the server before using the remaining bandwidth to transmit the video stream from each camera to the server system 164. In some implementations, the continuous video stream is sent and stored at one server facility while the video segments containing motion event candidates are send to and processed at a different server facility.

In some implementations, the smart device sends additional source information 503 to the server system 164. This additional source information 244 may include information regarding a device state (e.g., IR mode, AE mode, DTPZ settings, etc.) and/or information regarding the environment in which the device is located (e.g., indoors, outdoors, night-time, day-time, etc.). In some implementations, the source information 244 is used by the server system 164 to perform event detection, entity recognition, and/or to categorize event candidates. In some implementations, the additional source information 244 includes one or more preliminary results from video processing performed by the video source 241 (e.g., a doorbell 106), such as categorizations, object/entity recognitions, motion masks, and the like.

In some implementations, the video portion after an event start incident is detected is divided into multiple segments. In some implementations, the segmentation continues until event end information (sometimes also called an "end-of-event signal") is obtained. In some implementations, the segmentation occurs within the server system 164 (e.g., by the event processor 248). In some implementations, the segmentation comprises generating overlapping segments. For example, a 10-second segment is generated every second, such that a new segment overlaps the prior segment by 9 seconds.

In some implementations, each of the multiple segments is of the same or similar duration (e.g., each segment has a 10-12 second duration). In some implementations, the first segment has a shorter duration than the subsequent segments. Keeping the first segment short allows for real time initial categorization and alerts based on processing the first segment. The initial categorization may then be revised based on processing of subsequent segments. In some implementations, a new segment is generated if the motion entity enters a new zone of interest.

Figure 3:
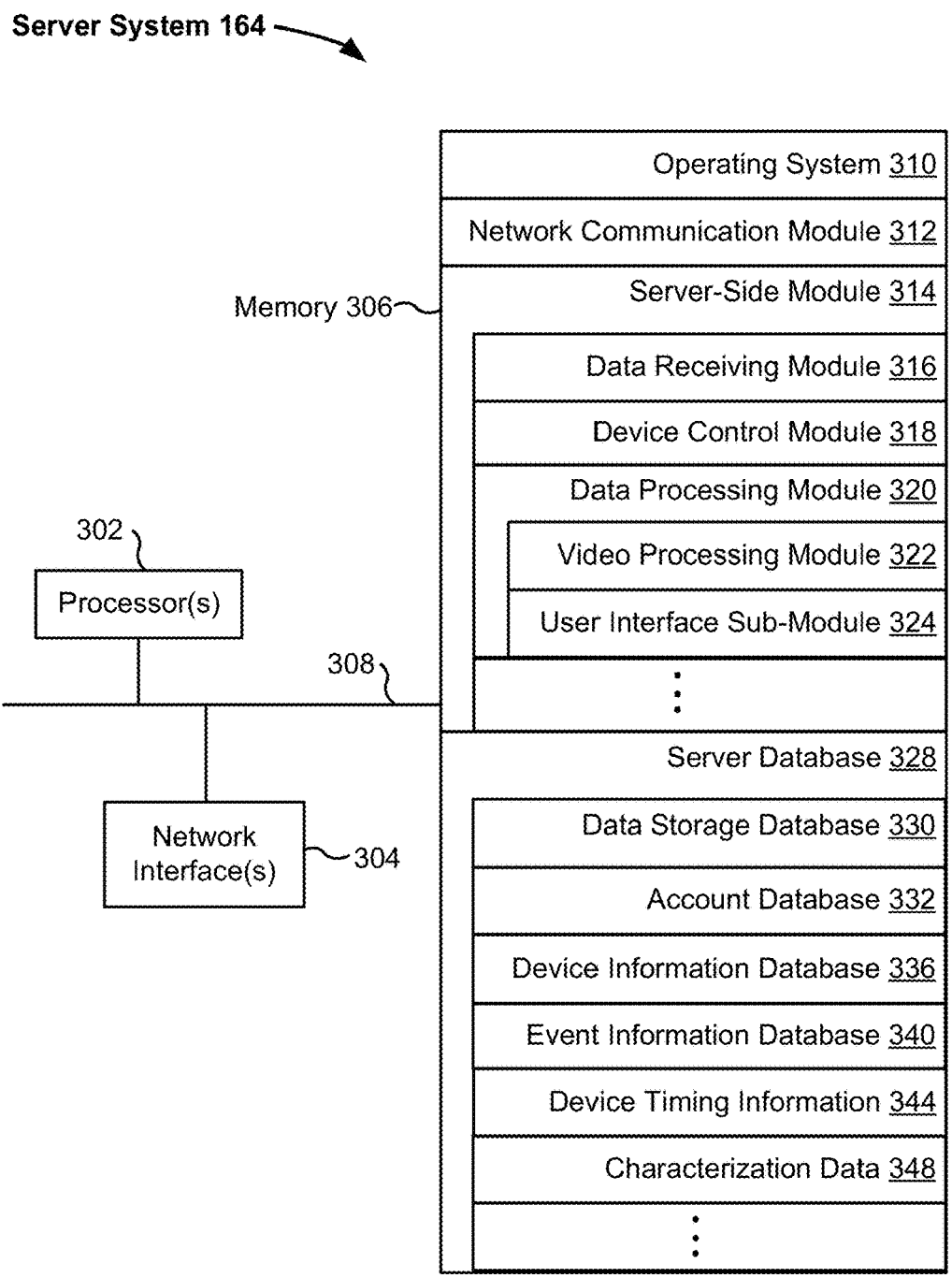
FIG. 3 is a block diagram illustrating a representative server system in accordance with some implementations.

In some implementations, after the event processor module obtains the video portion corresponding to an event candidate, the event processor 248 obtains background factors and performs motion entity detection identification, motion vector generation for each motion entity, and feature identification. Once the event processor 248 completes these tasks, the event categorizer 252 aggregates all of the information and generates a categorization for the motion event candidate. In some implementations, the event processor 248 and the event categorizer 252 are components of the video processing module 322 (FIG. 3). In some implementations, false positive suppression is optionally performed to reject some motion event candidates before the motion event candidates are submitted for event categorization. In some implementations, determining whether a motion event candidate is a false positive includes determining whether the motion event candidate occurred in a particular zone. In some implementations, determining whether a motion event candidate is a false positive includes analyzing an importance score for the motion event candidate. The importance score for a motion event candidate is optionally based on zones of interest involved with the motion event candidate, background features, motion vectors, scene features, entity features, motion features, motion tracks, and the like.

In some implementations, the video source 241 has sufficient processing capabilities to perform, and does perform, entity detection, person recognition, background estimation, motion entity identification, the motion vector generation, and/or the feature identification.

FIG. 3 is a block diagram illustrating the server system 164 in accordance with some implementations. The server system 164 includes one or more processing units (CPUs) 302, one or more network interfaces 304 (e.g., including an I/O interface to one or more client devices and an I/O interface to one or more electronic devices), memory 306, and one or more communication buses 308 for interconnecting these components (sometimes called a chipset). The memory 306 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processing units 302. The memory 306, or alternatively the non-volatile memory within memory 306, includes a non-transitory computer-readable storage medium. In some implementations, the memory 306, or the non-transitory computer-readable storage medium of the memory 306, stores the following programs, modules, and data structures, or a subset or superset thereof:

- an operating system 310 including procedures for handling various basic system services and for performing hardware dependent tasks;
- a network communication module 312 for connecting the server system 164 to other systems and devices (e.g., client devices, electronic devices, and systems connected to one or more networks 162) via one or more network interfaces 304 (wired or wireless);
- a server-side module 314, which provides server-side functionalities for device control, data processing, and data review, including, but not limited to:
  - a data receiving module 316 for receiving data from electronic devices (e.g., video data from a doorbell 106, FIG. 1), and preparing the received data for further processing and storage in the data storage database 3160;
  - a device control module 318 for generating and sending server-initiated control commands to modify operation modes of electronic devices (e.g., devices of a smart home environment 100), and/or receiving (e.g., from client devices 220) and forwarding user-initiated control commands to modify operation modes of the electronic devices;
  - a data processing module 320 for processing the data provided by the electronic devices, and/or preparing and sending processed data to a device for review (e.g., client devices 220 for review by a user), including, but not limited to:
- a video processor sub-module 322 for processing (e.g., categorizing and/or recognizing) detected entities and/or event candidates within a received video stream (e.g., a video stream from doorbell 106);
- a user interface sub-module 324 for communicating with a user (e.g., sending alerts, timeline events, etc. and receiving user edits and zone definitions and the like); and a server database 328, including but not limited to:
- a data storage database 330 for storing data associated with each electronic device (e.g., each doorbell) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub device 180 or smart devices are stored securely;
- an account database 332 for storing account information for user accounts, including user account information such as user profiles 334, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;
- a device information database 336 for storing device information related to one or more devices such as device profiles 338, e.g., device identifiers and hub device specific secrets, independently of whether the corresponding hub devices have been associated with any user account;
- an event information database 340 for storing event information such as event records 342 and context information, e.g., contextual data describing circumstances surrounding an approaching visitor; and
- characterization data 348 for use with characterizing motion, persons, and events within the smart home environment, e.g., in conjunction with data processing module 320.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above (e.g., an account management module for linking client devices, smart devices, and smart home environments).

Figure 4:
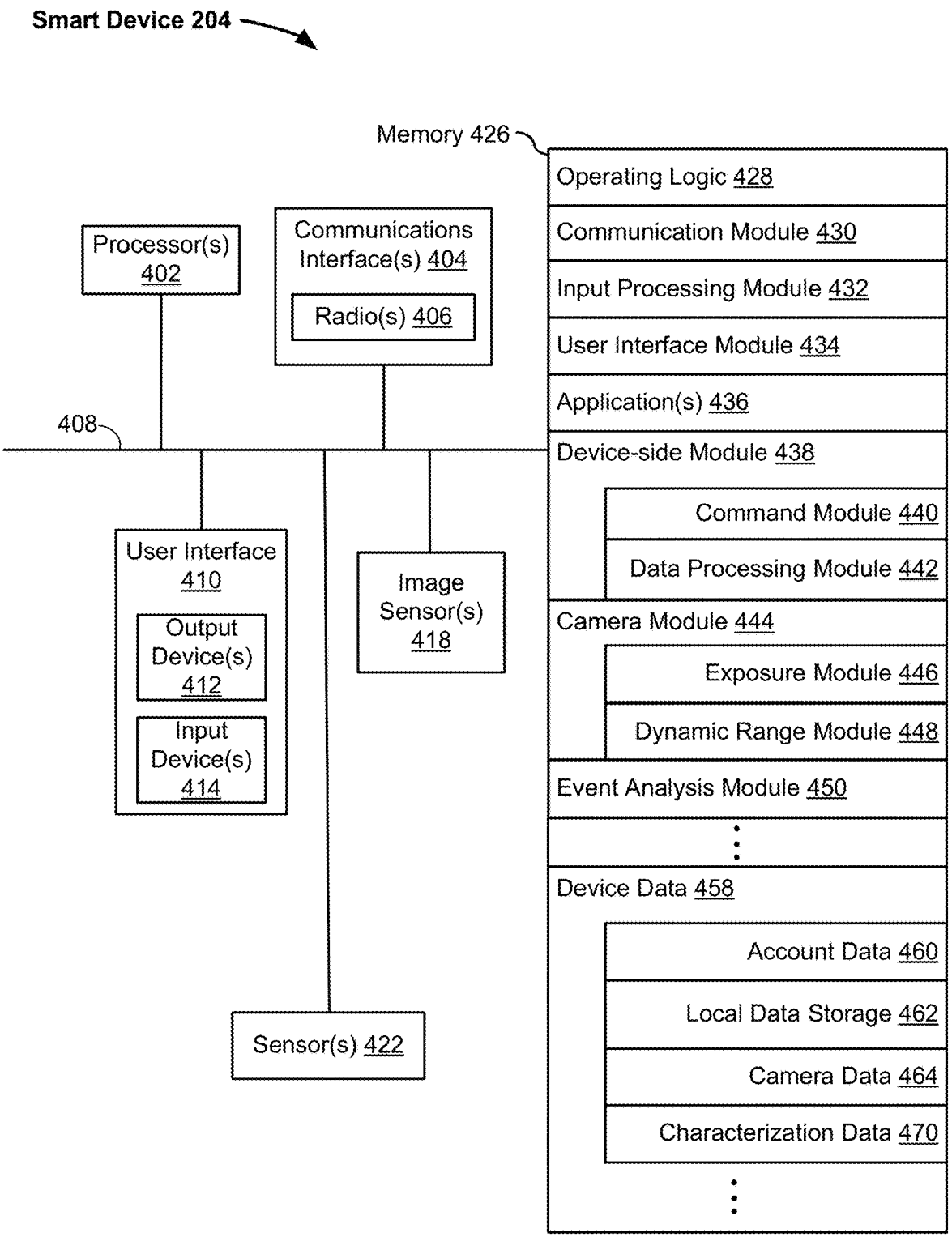
FIG. 4 is a block diagram illustrating a representative smart device in accordance with some implementations.

FIG. 4 is a block diagram illustrating a representative smart device 204 in accordance with some implementations. In some implementations, the smart device 204 (e.g., any devices of a smart home environment 100, FIG. 1) includes one or more processing units (e.g., CPUs, ASICs, FPGAs, microprocessors, and the like) 402, one or more communication interfaces 404 with radios 406, user interface 410, image sensor(s) 418, sensor(s) 422, memory 426, and one or more communication buses 408 for interconnecting these components (sometimes called a chipset). In some implementations, the user interface 410 includes one or more output devices 412 that enable presentation of media content, including one or more speakers and/or one or more visual displays. In some implementations, the user interface 410 includes one or more input devices 414, including user interface components that facilitate user input such as a keyboard, a mouse, a voice-command input unit or microphone, a touch screen display, a touch-sensitive input pad, a gesture capturing camera, or other input buttons or controls. In some implementations, an input device 414 for a doorbell 106 is a tactile or touch-sensitive doorbell button. Furthermore, some smart devices 204 use a microphone and voice recognition or a camera and gesture recognition to supplement or replace the keyboard.

The sensor(s) 422 include, for example, one or more thermal radiation sensors, ambient temperature sensors, humidity sensors, infrared (IR) sensors such as passive infrared (PIR) sensors, proximity sensors, range sensors, occupancy sensors (e.g., using RFID sensors), ambient light sensors (ALS), motion sensors 424, location sensors (e.g., GPS sensors), accelerometers, and/or gyroscopes.

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. The radios 406 enable one or more radio communication networks in the smart home environments, and enable a smart device 204 to communicate with other devices. In some implementations, the radios 406 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.).

The memory 426 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 426, or alternatively the non-volatile memory within the memory 426, includes a non-transitory computer-readable storage medium. In some implementations, the memory 426, or the non-transitory computer-readable storage medium of the memory 426, stores the following programs, modules, and data structures, or a subset or superset thereof:
- operating logic 428 including procedures for handling various basic system services and for performing hardware dependent tasks;
- a communication module 430 for coupling to and communicating with other network devices (e.g., a network interface 160, such as a router that provides Internet connectivity, networked storage devices, network routing devices, a server system 164, other smart devices 204, client devices 220, etc.) connected to one or more networks 162 via one or more communication interfaces 404 (wired or wireless);

an input processing module 432 for detecting one or more user inputs or interactions from the one or more input devices 414 and interpreting the detected inputs or interactions;

a user interface module 434 for providing and presenting a user interface in which settings, captured data, and/or other data for one or more devices (e.g., the smart device 204, and/or other devices in a smart home environment 100) can be configured and/or viewed;

one or more applications 436 for execution by the smart device (e.g., games, social network applications, smart home applications, and/or other web or non-web based applications) for controlling devices (e.g., executing commands, sending commands, and/or configuring settings of the smart device 204 and/or other client/ electronic devices), and for reviewing data captured by devices (e.g., device status and settings, captured data, or other information regarding the smart device 204 and/or other client/electronic devices);

a device-side module 438, which provides device-side functionalities for device control, data processing and data review, including but not limited to:
  a command module 440 for receiving, forwarding, and/or executing instructions and control commands (e.g., from a client device 220, from a server system 164, from user inputs detected on the user interface 410, etc.) for operating the smart device 204; and
  a data processing module 442 for processing data captured or received by one or more inputs (e.g., input devices 414, image sensor(s) 418, sensors 422, interfaces (e.g., communication interfaces 404, radios 440), and/or other components of the smart device 204, and for preparing and sending processed data to a remote device (e.g., client devices 220) for review by a user;

a camera module 444 for operating the image sensor(s) 418 and associated circuitry, e.g., for enabling and disabling the image sensor(s) 418 based on data from one or more low-power sensors 422 (e.g., data from a PIR sensor or ALS), including but not limited to:
  an exposure module 446 for adjusting exposure parameters of the image sensor(s) 418, such as shutter speed, gain, exposure ratios, and light intensity parameters; and
  a dynamic range module 448 for adjusting exposure times of the image sensor(s) 418 (e.g., automatically switching into and out of an HDR mode);

an event analysis module 450 for analyzing captured sensor data, e.g., to detect and/or recognize approaching visitors and context information; and device data 548 storing data associated with devices (e.g., the smart device 204), including, but is not limited to:
  account data 460 storing information related to user accounts linked to the smart device 204, e.g., including cached login credentials, smart device identifiers (e.g., MAC addresses and UUIDs), user interface settings, display preferences, authentication tokens and tags, password keys, and the like;
  local data storage 462 for selectively storing raw or processed data associated with the smart device 204, such as event data and/or video data captured by the image sensor(s) 418;
  camera data 464 storing information related operation of the image sensor, such as frame rate, shutter speed, analog gain, digital gain, image encoding, and compression; and
  characterization data 470 for entities, persons, and/or events detected by, or associated with, the smart device 204 (e.g., data generated or used by the characterization module 456).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 426, optionally, stores a subset of the modules and data structures identified above. Furthermore, the memory 426, optionally, stores additional modules and data structures not described above, such as a sensor management module for managing operation of the sensor(s) 422. In some implementations, one or more operations of the smart device 204 are performed by the server system 164. These operations include, but are not necessarily limited to, operations performed by or under control of computer program instructions such as the applications 436, device-side module 438, camera module 444 and event and event analysis module 450. In some implementations, device data 458 associated with these operations that are performed by the server system 164 are stored, maintained and updated in whole or in part on or by the server system 164.

Figure 5A:
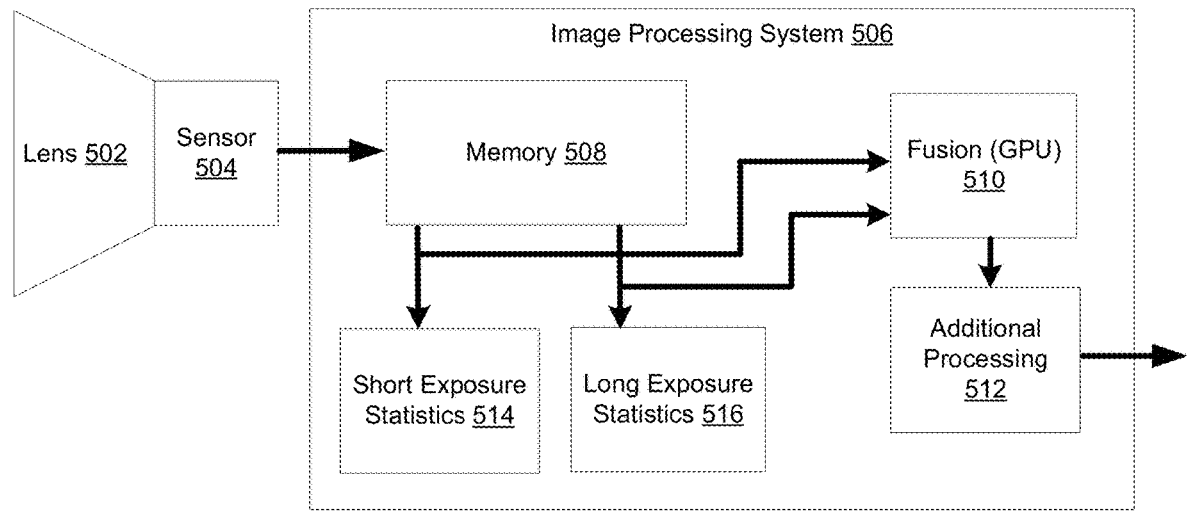
FIGS. 5A-5B are block diagrams illustrating representative camera devices in accordance with some implementations.
Figure 5B:
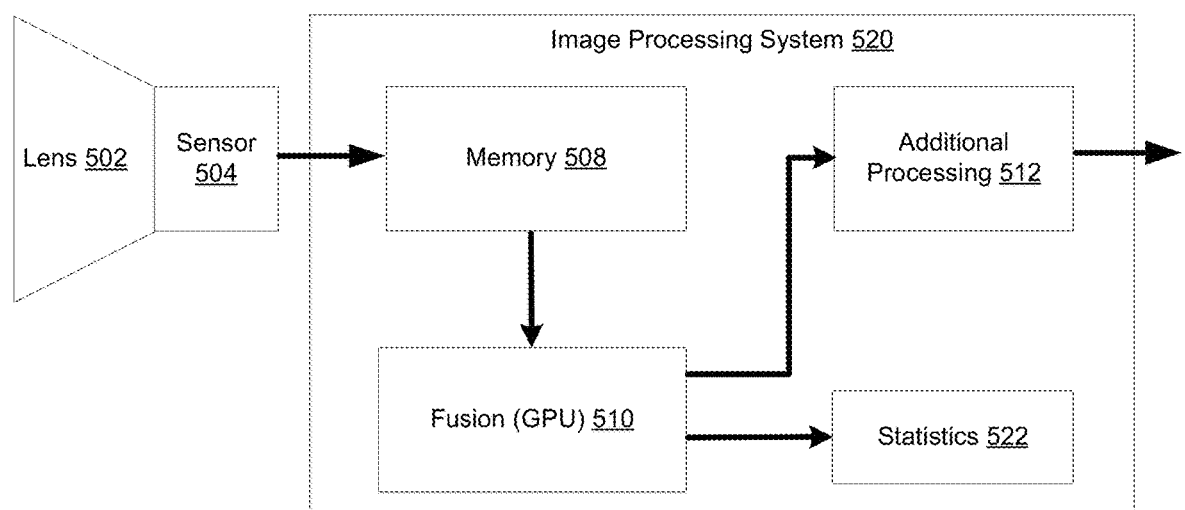

FIGS. 5A-5B are block diagrams illustrating representative camera devices in accordance with some implementations. In some implementations, the camera devices 501 and 521 comprise smart devices 204. In some implementations, the memory 508 is the memory 426 and/or stores the programs, modules, and data structures of memory 426. In some implementations, the sensor 504 is an image sensor 418 and/or operates in a similar manner.

In various implementations, exposure statistics for HDR imaging are gathered in differing manners. For example, statistics are optionally gathered on: (1) only one of the two exposure times; (2) each of the exposure times separately; (3) both of the exposure times together; or (4) the fused image (e.g., before local tone mapping).

FIG. 5A shows the camera device 501 configured to obtain and store exposure statistics prior to fusion of short and long exposure images in accordance with option 2 above. As shown in FIG. 5A, image data is captured via the lens 502 at the image sensor 504. In an HDR mode, the image data is captured at differing exposure times. In some implementations, the image data is stored in memory 508 (e.g., a memory buffer, cache, or other device). In some implementations, exposure statistics are obtained for each frame and/or exposure time. In some implementations, the exposure statistics include light intensity data and/or color data for each pixel. The image data for the short and long exposure times is combined (fused) at a fusion module 510 (e.g., within a graphics processing unit (GPU)). In some implementations, the fusion module 510 is the camera module 444. Once the image data is combined, additional image processing, such as local tone mapping (LTM), is optionally performed. In the example shown by FIG. 5A, exposure statistics are gathered on the individual frames (e.g., the exposure data is 10 bits wide as shown by the long exposure 602 and short exposure 604 in FIG. 6).

FIG. 5B shows the camera device 521 configured to obtain and store exposure statistics after fusion of short and long exposure images in accordance with option 4 above. As with the camera device 501, in the camera device 521 image data is captured via the lens 502 at the image sensor 504, and, in an HDR mode, the image data is captured at differing exposure times. In some implementations, the image data is stored in memory 508. The image data for the short and long exposure times is combined (fused) at the fusion module 510 (e.g., within a graphics processing unit (GPU)). Once the image data is combined, exposure statistics are obtained for the fused image (e.g., light intensity data and data indicating whether each pixel was selected from the short exposure image or the long exposure image) and additional image processing, such as LTM, is optionally performed. In the example shown by FIG. 5B, exposure statistics are gathered on the raw fused image after fusion (e.g., the exposure data is 13 bits wide as shown by the composite exposure 606 in FIG. 6).

HDR photo techniques are used to capture images in which the scene content has a very wide range of lighting conditions, specifically very bright and very low level light in the same scene (also sometimes called a high dynamic range scene). A high dynamic range scene presents problems for standard imaging systems because the exposure value (combination of exposure time and gain) is fixed for the entire frame. Conventional HDR techniques capture multiple frame exposures then an image processor fuses parts from the different frames to create a composite image. Optionally, the image processor applies Local Tone Mapping (LTM) to the composite to smooth the colors at the fusion points. These techniques are generally not desirable for use in a video system since full frame exposures are separated by too much time resulting in undesirable motion artifacts.

FIG. 6 is a block diagram illustrating a representative high dynamic range mode in accordance with some implementations. As shown in FIG. 6, a long exposure image 602 is used to capture low-to-medium lux level (low light) portions of the scene, and a short exposure image 604 is used to capture medium-to-high lux level portions of the scene. The long exposure image 602 and the short exposure image 604 are combined to create a composite exposure image 606 capturing low-to-high lux levels. For example, the low lux level portions of the scene captured in the short exposure image 604 are combined with the high lux level portions of the scene captured in the long exposure image 602.

In some implementations, a staggered HDR process is utilized by the camera device (e.g., the camera device 501 or 521). A staggered HDR process also involves multiple exposures, but instead of being performed a full frame at time, the multitude of exposures are delivered for portions of the frame, e.g., one "frame line" at a time. As used herein, a "frame line" is a line (e.g., a horizontal or vertical line) in a frame of video. For example, a sensor operating in a "2 frame staggered HDR" exposes each line to two different exposure times, a long exposure and a short exposure, and it delivers each line of the frame twice, e.g., first the short exposure version then the long exposure version. In this example, line 1 of the frame would come out twice, then line two would come out twice, then line three, and so on. In accordance with some implementations, an image processor generates a composite of the two lines in order to create an optimal frame. In some implementations, an automatic exposure (AE) process is integrated with the HDR process, so as to determine optimal exposures to enable the creation of optimal composite frames.

Figure 7A:
FIGS. 7A-7B are example long and short exposure images in accordance with some implementations.
Figure 7B:

FIGS. 7A-7B are example long and sure exposure images in accordance with some implementations. FIG. 7A shows a long exposure image 702 and FIG. 7B shows a short exposure image 704. In accordance with some implementations, select pixels from the long exposure image 702 and the short exposure image 704 are combined (fused) to form a composite image without the over- or under-exposed regions.

Figure 8A:
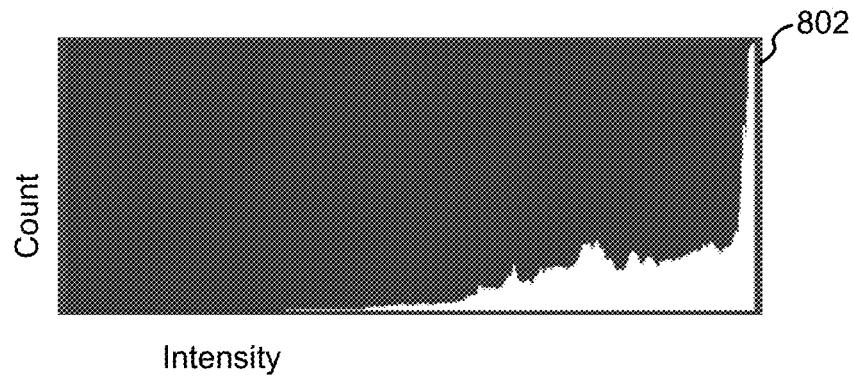
FIGS. 8A-8B are example light intensity histograms for the images of FIGS. 7A-7B in accordance with some implementations.
Figure 8B:
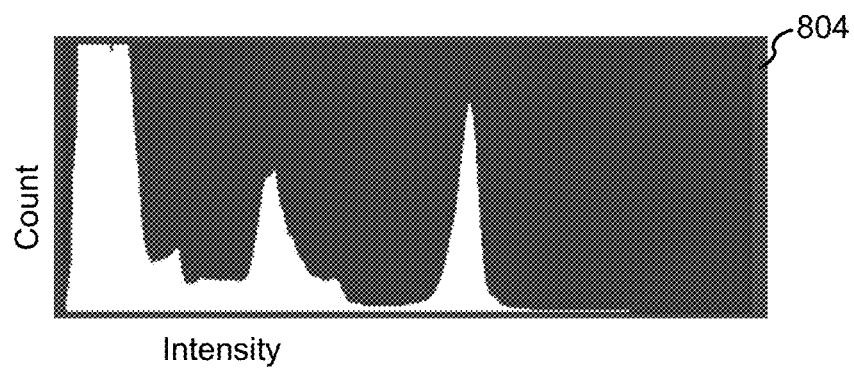

FIGS. 8A-8B are example light intensity histograms for the images of FIGS. 7A-7B in accordance with some implementations. The histograms are graphs showing a number of pixels in respective images at each different intensity value found in that image. The light intensity histogram 802 in FIG. 8A shows that the pixels in long exposure image 702 are binned in the medium-to-high light intensity bins (also sometimes called sigma bins). The light intensity histogram 804 in FIG. 8B shows that the pixels in the short exposure image 704 are binned in the medium-to-low light intensity bins.

In some implementations, long exposure and short exposure statistics are obtained prior to fusing (e.g., as illustrated in FIG. 5A), including data regarding light intensity per pixel as illustrated in FIGS. 8A-8B. In some implementations, light intensity data for a particular color (e.g., red, green, or blue) is obtained and analyzed to determine whether to disable or exit HDR mode, including, when the camera device is a video camera, while the camera device is operating in an active or live video mode.

In some implementations, the camera device uses histogram analysis to determine whether to operate in an HDR mode (e.g., to determine whether an HDR scene is present at a given time). In some implementations, the histogram analysis depends on where and what statistics are gathered, as discussed below in reference to FIGS. 9-13.

As an example, assume the histograms in FIGS. 8A-8B range from 0 to 255, the target light intensity is 128, and the exposure ratio is 8, the short exposure average light intensity is 63, and the long exposure average light intensity is 180. In this example, adjusting the long exposure to correct the average (e.g., by the ratio of target light intensity to long exposure average light intensity (128/180)) results in saturation of pixels from the short exposure. Adjusting the short exposure by the short exposure average light intensity multiplied by the above ratio (63*128/180) results in a short exposure average light intensity of 44.8. Thus, the average pixels in the short exposure would be 44.8 multiplied by the exposure ratio (8) resulting in a value of 358, which is outside of the range of the histogram (indicating that these pixels would be saturated).

Figure 9:
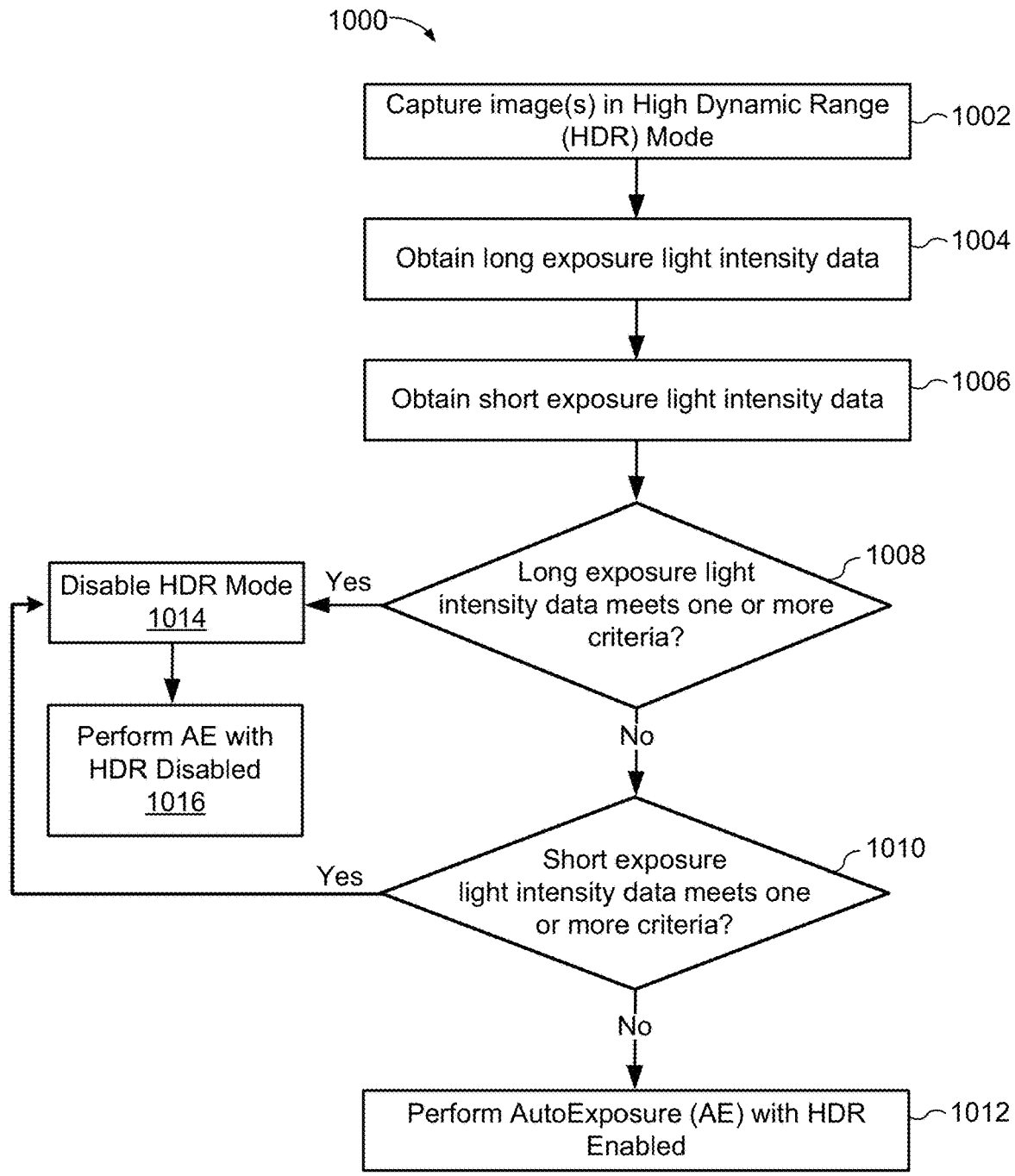
FIG. 9 is a flow diagram illustrating a representative method of disabling a high dynamic range mode in a camera device in accordance with some implementations.

FIGS. 9-13 illustrate methods for automatically (without user input) switching between an HDR mode and a non-HDR mode based on exposure statistics. In some implementations, the methods of FIGS. 9-13 are performed by a video camera device concurrently with capturing live video data. FIG. 9 is a flow diagram illustrating a method 1000 of disabling a high dynamic range mode in a camera device in accordance with some implementations. In some implementations, the method 1000 is performed by a camera device, such as a camera 118, smart doorbell 106, or other camera-equipped smart device 204. In some implementations, the method 1000 performed by components of a smart device 204, such as camera module 444 in conjunction with image sensor(s) 418. In some implementations, the method 1000 is performed at a server system, such as server system 164. For example, a camera device sends the long and short exposure data to the server system, which performs image analysis and sends corresponding parameter updates to the camera device. In some implementations, the operations of the method 1000 described herein are interchangeable, and respective operations of the method 1000 are performed by any of the aforementioned systems or devices. In some implementations, the method 1000 is governed by instructions that are stored in a non-transitory computer-readable storage medium and that is executed by one or more processors or controllers of a device, such as the processor(s) 402. For convenience, the method 1000 is described below as being performed by a camera device.

The camera device captures (1002) image(s) in a High Dynamic Range (HDR) mode. For example, the camera device is a smart device 204 and captures the images via an image sensor 418. As another example, the camera device is a camera device 501 and capture the images via the lens 502 and sensor 504. In some implementations, the camera device comprises a video camera device and captures video data of a scene in a field of view of the camera's image sensor. In some implementations, capturing the image(s) in the HDR mode comprises capturing video data in a staggered HDR mode. In some implementations, the HDR mode is a staggered HDR mode. In some implementations, capturing video data of the scene in the HDR mode includes, for each line in a frame, capturing the line with a first exposure time and with a second exposure time.

In some implementations, capturing the image(s) in the HDR mode includes: (1) capturing a first subset of video data with a first exposure time; and (2) capturing a second subset of video data with a second exposure time, lower than the first exposure time (e.g., the duration of the first exposure is 5, 10, or 20 times the duration of the second exposure). In some implementations, capturing video data of the scene in the HDR mode includes, for each line in a frame, capturing the line with a first exposure time and with a second exposure time.

In some implementations, after capturing the video data, the camera device combines first video data of the first subset of video data with second video data of the second subset of video data to generate an HDR frame. In some implementations, determining whether the first subset of the video data meets the one or more first predefined criteria and determining whether the second subset of the video data meets the one or more second predefined criteria includes determining whether video data of the HDR frame meets one or more predefined HDR criteria. In some implementations, the HDR criteria include whether a current exposure ratio equals a minimum exposure ratio, whether a number of pixels in boundary bins (e.g., sigma bins representing the uppermost/lowermost 1%, 2%, or 5% of pixels) meets pixel count criteria, and/or whether an average light intensity is less than a light intensity target.

In some implementations, the camera device stores HDR information regarding pixel selection for the HDR frame; and determining whether the first subset of the video data meets the one or more first predefined criteria and determining whether the second subset of the video data meets the one or more second predefined criteria includes determining whether the stored HDR information meets one or more predefined HDR criteria. In some implementations, the HDR criteria include whether a number of pixels from short exposure with particular parameters are included in the HDR frame.

The camera device obtains (1004) long exposure light intensity data. In some implementations, the long exposure light intensity data includes average light intensity data and/or light intensity data per pixel for the long exposure. For example, the camera device 501 obtains long exposure statistics 516 from memory 508.

The camera device obtains (1006) short exposure light intensity data. In some implementations, the short exposure light intensity data includes average light intensity data and/or light intensity data per pixel for the short exposure. For example, the camera device 501 obtains short exposure statistics 514 from memory 508. In some implementations, the order of operations 1004 and 1006 is reversed. In some implementations, the camera device concurrently obtains the long exposure and short exposure light intensity data.

The camera device determines (1008) whether the long exposure light intensity data meets one or more first criteria. For example, the camera device determines whether the long exposure light intensity data meets the one or more first criteria using a camera module 444. In some implementations, determining whether the long exposure light intensity data meets the one or more first criteria includes determining whether a threshold number of pixels have respective light intensities above a particular light intensity threshold. In some implementations, determining whether the long exposure light intensity data meets the one or more first criteria includes determining whether an average light intensity for the long exposure is greater than a target light intensity. In some implementations, the camera device determines whether a current ratio between the short exposure and the long exposure meets one or more criteria (e.g., whether the current ratio is a minimum ratio for the camera device). In some implementations, the camera device determines whether the first subset of the video data meets one or more first predefined criteria. In some implementations, determining whether the first subset of the video data meets the one or more first predefined criteria includes: (1) binning pixels of the first subset of the video data by color intensity; and (2) determining whether a number of pixels in one or more boundary bins (e.g., sigma bins representing the uppermost/lowermost 5%, 2%, or 1% of pixel intensities) meets a minimum pixel count criterion. In some implementations, determining whether the first subset of the video data meets the one or more first predefined criteria includes determining whether a light intensity of the first subset of the video data meets a light intensity criterion (e.g., whether an average light intensity exceeds a target light intensity for the scene).

In accordance with a determination that the long exposure light intensity data does not meet the one or more first criteria, the camera device determines (1010) whether the short exposure light intensity data meets one or more second criteria. For example, the camera device determines whether an average light intensity for the short exposure meets one or more criteria (e.g., whether the average light intensity is less than a threshold value). In some implementations, the average light intensity is adjusted based on exposure target and the camera device determines whether the adjusted average light intensity meets the one or more criteria. In some implementations, the camera device determines whether the second subset of the video data meets one or more second predefined criteria. In some implementations, determining whether the second subset of the video data meets the one or more second predefined criteria includes determining whether a light intensity of the second subset of the video data meets a light intensity criterion. In some implementations, the order of operations 1008 and 1010 is reversed.

In accordance with a determination that the short exposure light intensity data does not meet the one or more second criteria, the camera device performs (1012) automatic exposure with the HDR mode enabled. In some implementations, in accordance with the determination that the short exposure light intensity data does not meet the one or more second criteria, the camera device performs the method 1500 of FIGS. 14A-14B.

In accordance with a determination that the short exposure light intensity data meets the one or more second criteria or in accordance with a determination that the long exposure light intensity data meets the one or more first criteria, the camera device disables (1014) the HDR mode. In some implementations, in accordance with a determination that the first subset meets the one or more first predefined criteria or a determination that the second subset meets the one or more second predefined criteria, the camera device switches operation from the HDR mode to a non-HDR mode. In some implementations, disabling the HDR mode includes determining an exposure time for subsequent frames. In some implementations, the exposure time for subsequent frames is selected based on the long exposure and/or short exposure statistics. In some implementations, the exposure time for subsequent frames is selected based on previously used exposure times.

After disabling the HDR mode, the camera performs (1016) automatic exposure with the HDR mode disabled. For example, the camera performs automatic exposure based on only the short exposure or only the long exposure image. In some implementations, after disabling the HDR mode, the camera device executes an automatic exposure process based on the long and/or short exposure light intensity data (e.g., similar to the method 1500 in FIGS. 14A-14B).

In some implementations, while operating in the non-HDR mode, the camera device: (1) captures second video data of the scene with the image sensor; (2) determines whether the second video data meets one or more third predefined criteria; and (3) in accordance with a determination that the second video data meets the one or more third predefined criteria, switches operation from the non-HDR mode to the HDR mode. In some implementations, determining whether the second video data meets the one or more third predefined criteria includes determining whether a light intensity of the second video data meets a light intensity criterion (e.g., whether an average light intensity exceeds a target light intensity for the scene). In some implementations, determining whether the second video data meets the one or more third predefined criteria includes: binning pixels of the second video data by color intensity; and determining whether a number of pixels in one or more boundary bins meets a minimum pixel count criterion. In some implementations, after disabling the HDR mode, the camera device performs the method 1400 in FIG. 13.

Figure 10:
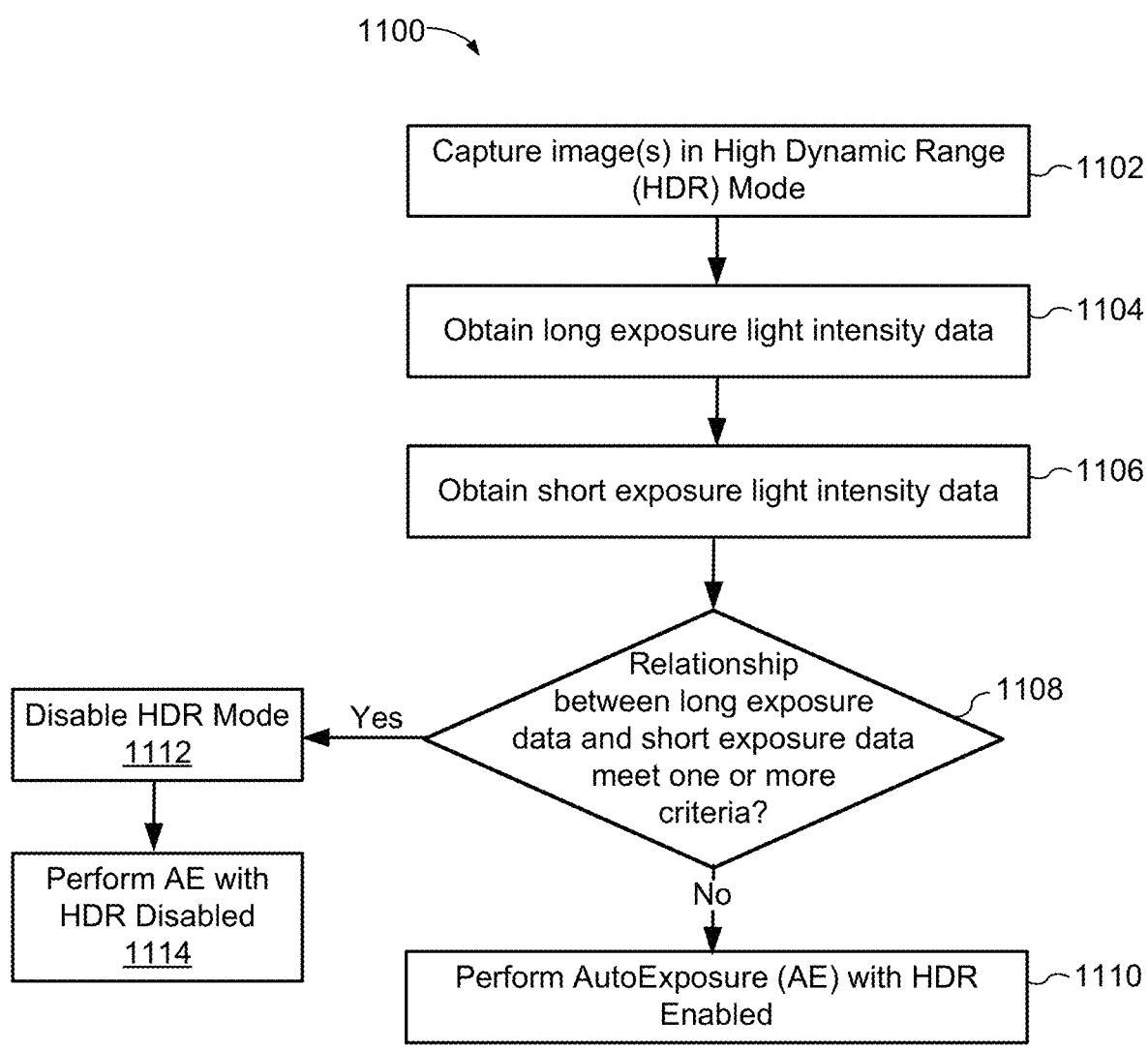
FIG. 10 is a flow diagram illustrating another representative method of disabling a high dynamic range mode in a camera device in accordance with some implementations.

FIG. 10 is a flow diagram illustrating a method 1100 of disabling a high dynamic range mode in a camera device in accordance with some implementations. In some implementations, the method 1100 is performed by a camera device, such as a camera 118, smart doorbell 106, or other camera-equipped smart device 204. In some implementations, the method 1100 performed by components of a smart device 204, such as camera module 444 in conjunction with image sensor(s) 418. In some implementations, the method 1100 is performed at a server system, such as server system 164. In some implementations, the operations of the method 1100 described herein are interchangeable, and respective operations of the method 1100 are performed by any of the aforementioned systems or devices. In some implementations, the method 1100 is governed by instructions that are stored in a non-transitory computer-readable storage medium and that is executed by one or more processors or controllers of a device, such as the processor(s) 402. For convenience, the method 1100 is described below as being performed by a camera device.

The camera device captures (1102) image(s) in a high dynamic range mode. For example, the camera device is a smart device 204 and captures the images via an image sensor 418. As another example, the camera device is a camera device 501 and captures the images via the lens 502 and sensor 504. In some implementations, the camera device comprises a video camera device and captures video data of a scene in a field of view of the camera's image sensor. In some implementations, capturing the image(s) in the HDR mode comprises capturing video data in a staggered HDR mode. In some implementations, the HDR mode is a staggered HDR mode. In some implementations, capturing video data of the scene in the HDR mode includes, for each line in a frame, capturing the line with a first exposure time and with a second exposure time. In some implementations, the operation 1102 is the same as the operation 1002 discussed above.

In some implementations, capturing the image(s) in the HDR mode includes: (1) capturing a first subset of video data with a first exposure time; and (2) capturing a second subset of video data with a second exposure time, lower than the first exposure time (e.g., the duration of the first exposure is 5, 10, or 20 times the duration of the second exposure). In some implementations, capturing video data of the scene in the HDR mode includes, for each line in a frame, capturing the line with a first exposure time and with a second exposure time.

In some implementations, after capturing the video data, the camera device combines first video data of the first subset of video data with second video data of the second subset of video data to generate an HDR frame. In some implementations, determining whether the first subset of the video data meets the one or more first predefined criteria and determining whether the second subset of the video data meets the one or more second predefined criteria includes determining whether video data of the HDR frame meets one or more predefined HDR criteria. In some implementations, the HDR criteria include whether a current exposure ratio equals a minimum exposure ratio, whether a number of pixels in boundary bins meets pixel count criteria, and/or whether an average light intensity is less than a light intensity target.

In some implementations, the camera device stores HDR information regarding pixel selection for the HDR frame; and determining whether the first subset of the video data meets the one or more first predefined criteria and determining whether the second subset of the video data meets the one or more second predefined criteria includes determining whether the stored HDR information meets one or more predefined HDR criteria. In some implementations, the HDR criteria include whether a number of pixels from short exposure with particular parameters are included in the HDR frame.

The camera device obtains (1104) long exposure light intensity data. In some implementations, the long exposure light intensity data includes average light intensity data and/or light intensity data per pixel for the long exposure. For example, the camera device 501 obtains long exposure statistics 516 from memory 508. In some implementations, the operation 1104 is the same as the operation 1004 discussed above.

The camera device obtains (1106) short exposure light intensity data. For example, the camera device 501 obtains short exposure statistics 514 from memory 508. In some implementations, the order of the operations 1104 and 1106 is reversed. In some implementations, the camera device concurrently obtains the long exposure and short exposure light intensity data. In some implementations, the operation 1106 is the same as the operation 1006 discussed above.

The camera device determines (1108) whether a relationship between the long exposure data and the short exposure data meets one or more criteria. In some implementations, determining whether the relationship meets the one or more criteria includes determining whether a distance between an ideal exposure time for the short exposure and the long exposure time is less than an exposure distance threshold. In some implementations, the ideal exposure time for the short exposure is equal to a ratio of a light intensity target to an average light intensity for the short exposure multiplied by the short exposure time. In some implementations, the exposure distance threshold indicates that information in the short exposure is not available in the long exposure. In some implementations, the exposure distance threshold is tunable.

In accordance with a determination that the relationship does not meet the one or more criteria, the camera device performs (1110) automatic exposure with the HDR mode enabled. In some implementations, in accordance with a determination that the relationship does not meet the one or more criteria, the camera device performs the method 1500 of FIGS. 14A-14B.

In accordance with a determination that the relationship meets the one or more criteria, the camera device disables (1112) the HDR mode. In some implementations, disabling the HDR mode includes determining an exposure time for subsequent frames. In some implementations, the exposure time for subsequent frames is selected based on the long exposure and/or short exposure statistics. In some implementations, the exposure time for subsequent frames is selected based on previously used exposure times.

After disabling the HDR mode, the camera device performs (1114) the automatic exposure with the HDR mode disabled. For example, the camera performs automatic exposure based on only the short exposure or only the long exposure image. In some implementations, after disabling the HDR mode, the camera device executes an automatic exposure process based on the long and/or short exposure light intensity data (e.g., similar to the method 1500 in FIGS. 14A-14B). In some implementations, after disabling the HDR mode, the camera device performs the method 1400 in FIG. 13.

Figure 11:
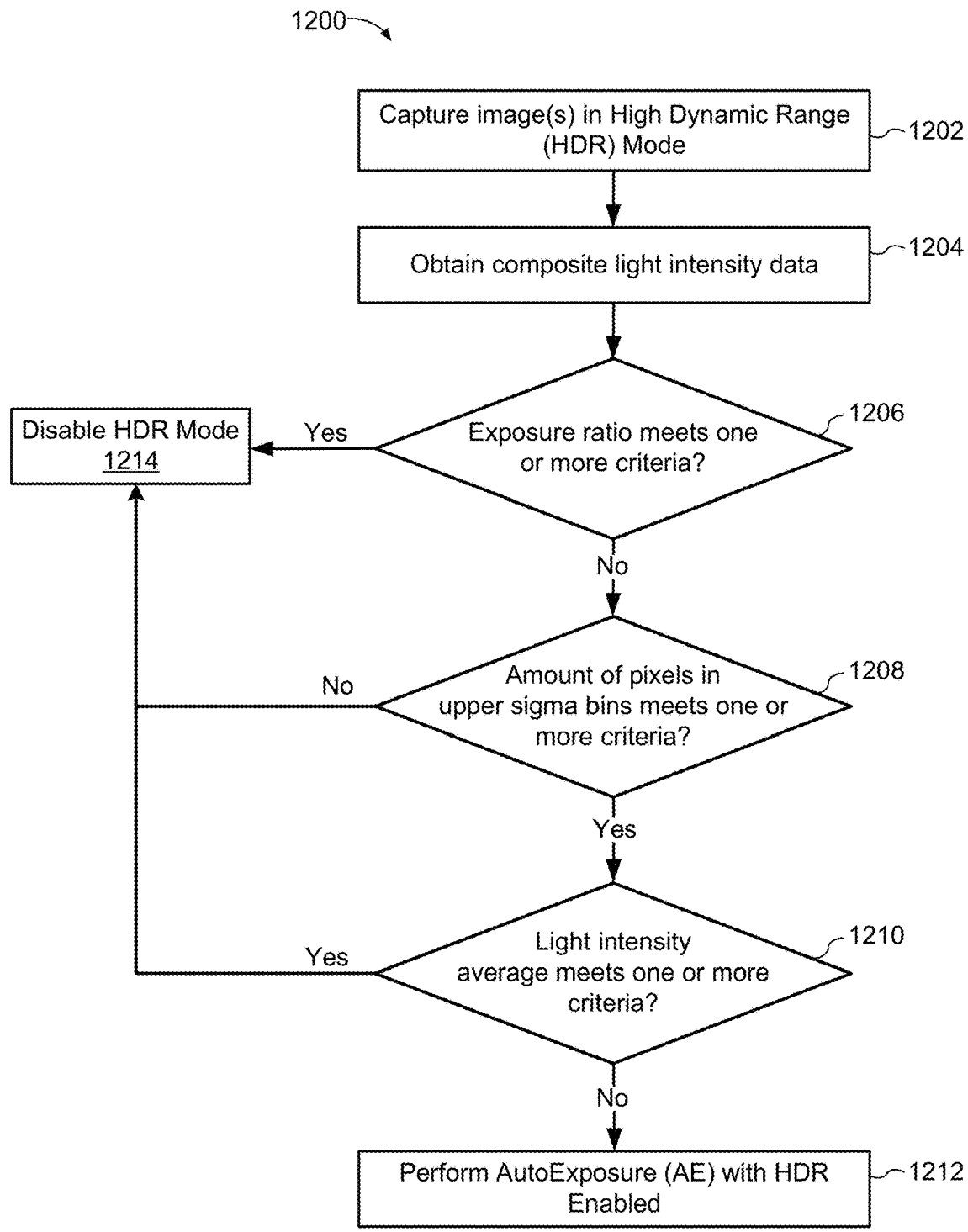
FIG. 11 is a flow diagram illustrating another representative method of disabling a high dynamic range mode in a camera device in accordance with some implementations.

FIG. 11 is a flow diagram illustrating a method 1200 of disabling a high dynamic range mode in a camera device in accordance with some implementations. In some implementations, the method 1200 is performed by a camera device, such as a camera 118, smart doorbell 106, or other camera-equipped smart device 204. In some implementations, the method 1200 performed by components of a smart device 204, such as camera module 444 in conjunction with image sensor(s) 418. In some implementations, the method 1200 is performed at a server system, such as server system 164. In some implementations, the operations of the method 1200 described herein are interchangeable, and respective operations of the method 1200 are performed by any of the aforementioned systems or devices. In some implementations, the method 1200 is governed by instructions that are stored in a non-transitory computer-readable storage medium and that is executed by one or more processors or controllers of a device, such as the processor(s) 402. For convenience, the method 1200 is described below as being performed by a camera device.

The camera device captures (1202) image(s) in a high dynamic range mode. For example, the camera device is a smart device 204 and captures the images via an image sensor 418. As another example, the camera device is a camera device 501 and capture the images via the lens 502 and sensor 504. In some implementations, the camera device comprises a video camera device and captures video data of a scene in a field of view of the camera's image sensor. In some implementations, capturing the image(s) in the HDR mode comprises capturing video data in a staggered HDR mode. In some implementations, the HDR mode is a staggered HDR mode. In some implementations, the operation 1202 is the same as the operation 1002 discussed above.

The camera device obtains (1204) composite light intensity data. The composite light intensity data corresponds to a composite image (e.g., are taken after the long exposure and short exposure images are fused into the composite image). For example, the camera device 521 obtains exposure statistics 522 from memory 508. In some implementations, the composite light intensity data includes a number of pixel having a light intensity above a threshold amount of light intensity. In some implementations, the composite light intensity data includes a current exposure ratio and/or an average light intensity of the composite light intensity data.

In some implementations, to obtain light intensity (luma) statistics on a frame, a tiled representation is obtained. For example, if the image resolution is 1600 by 1200 pixels, that image can be represented as 16 by 12 tiles. In this example, the first tile is the average red, average green, and average blue of the area of the image described as the first 100 rows by the first 100 columns; and the second tile is the first 100 rows by the second 100 columns, etc. In some implementations, a light intensity is calculated for each tile.

In some implementations, the average light intensity is obtained via one or more weighting matrices. For example, the tile representation of the image can be thought of as a matrix—if that matrix is multiplied by a weighting matrix, different parts of the image can be excluded or amplified. In some implementations, an area in the center of the image is more heavily weighted (e.g., using a weighting matrix) compared to areas around the edges. In some implementations, areas in the image where the motion is present are more heavily weighted compared to areas without motion. In some implementations, areas in the image corresponding to zone(s) of interest are more heavily weighted compared to areas outside of the zone(s) of interest. In some implementations, by weighting the light intensity data, more consideration is given to portions of interest within the image in a decision about staying in HDR mode.

The camera device determines (1206) whether the exposure ratio meets one or more first criteria. In some implementation, determining whether the exposure ratio meets the one or more first criteria includes determining whether the exposure ratio is set to (or below) a minimum ratio threshold. In some implementations, an automatic exposure process (e.g., a process similar to the method 1500 in FIGS. 14A-14B) sets long and short exposure times independently.

In accordance with some implementations, the exposure ratio is equal to the long exposure time divided by the short exposure time. In some implementations, the determination (1206) evaluates whether or not the exposure ratio is "big enough" to warrant staying in HDR mode (e.g., whether or not the exposure ratio is greater than a minimum exposure ratio). In some implementations, the minimum ratio is set by the image sensor. For example, a particular image sensor delivers 10 bits of data in an HDR mode, and 12 bits of data in a non-HDR mode, thus a ratio of 4 is essentially the same as operating in the non-HDR mode. In this example, exposure ratios less than 4 would deliver less dynamic range than operating in the non-HDR mode.

In accordance with a determination that the exposure ratio does not meet the one or more first criteria, the camera device determines (1208) whether an amount of pixels in upper sigma bin(s) (e.g., the upper 5%, 2%, or 1% of sigma bins) meets one or more second criteria. In some implementations, the camera device determines whether an amount of pixels in lower sigma bin(s) (e.g., the lower 5%, 2%, or 1% of sigma bins) meets one or more criteria. In accordance with some implementations, histogram statistics are produced by an image signal processor of the camera device. In some implementations, each bin of the histogram represents a digital number which is a value of the pixel. For example, the uppermost histogram bin represents the number of pixels whose value is 1023 or higher, the lowermost bin is the number of pixels with a value of zero. In accordance with some implementations, the uppermost bin represents the number of pixels that are saturated.

For example, if they are more than a threshold amount of saturated pixels, then the camera device exits HDR mode because the scene is determined to be too bright for HDR. As another example, if there are more than a threshold amount of pixels in the lower bins, then the camera exits the HDR mode as the image is determined to be overexposed. For example, if the number of pixels in the lower 2% of the bins is more than a threshold amount less than the number of pixels in the upper 2% of the bins, then the camera exits the HDR mode.

In some implementations, determining whether the amount of pixels in the upper sigma bins meets the one or more second criteria includes determining whether the amount of pixels exceeds a particular threshold. In various implementations, the particular threshold is set to 1%, 2%, 5%, or 10% of the pixels in the uppermost bin. In some implementations, determining whether the amount of pixels in the upper sigma bins meets the one or more second criteria includes comparing an amount of pixels in the upper sigma bins (e.g., saturated pixels) to an amount of pixels in the lower sigma bins (e.g., black pixels). For example, determining an exposure balance as a ratio of saturated pixels versus black pixels. In some implementations, when the amount of pixels in the upper sigma bins exceeds a first threshold (e.g., there are too many saturated pixels) and the amount of pixels in the lower sigma bins does not meet a second threshold (e.g., not enough black pixels), the camera device exits the HDR mode. In some implementations, when there are not many saturated pixels and average light intensity exceeds a light intensity target, the camera exits the HDR mode.

In accordance with a determination that the amount of pixels in the upper sigma bins meets the one or more second criteria, the camera device determines (1210) whether a light intensity average meets one or more third criteria. In some implementations, determining whether the light intensity average meets the one or more third criteria includes determining whether light intensity average is less than, or optionally equal to, a target light intensity. In some implementations, the ordering of the operations 1206, 1208, and 1210 is reversed or otherwise altered.

In accordance with a determination that the light intensity average does not meet the one or more third criteria, the camera device performs (1212) automatic exposure with the HDR mode enabled. In some implementations, in accordance with a determination that the light intensity average does not meet the one or more third criteria, the camera device performs the method 1500 of FIGS. 14A-14B.

In accordance with a determination that: (1) the exposure ratio meets the one or more first criteria, (2) the amount of pixels in the upper sigma bins does not meet the one or more second criteria, or (3) the light intensity average meets the one or more third criteria, the camera device disables (1214) the HDR mode. In some implementations, disabling the HDR mode includes determining an exposure time for subsequent frames. In some implementations, the exposure time for subsequent frames is selected based on the long exposure and/or short exposure statistics. In some implementations, the exposure time for subsequent frames is selected based on previously used exposure times.

In some implementations, after disabling the HDR mode, the camera device performs automatic exposure with the HDR mode disabled. For example, the camera performs automatic exposure based on only the short exposure or only the long exposure image. In some implementations, after disabling the HDR mode, the camera device executes an automatic exposure process based on the long and/or short exposure light intensity data (e.g., similar to the method 1500 in FIGS. 14A-14B). In some implementations, after disabling the HDR mode, the camera device performs the method 1400 in FIG. 13.

Figure 12:
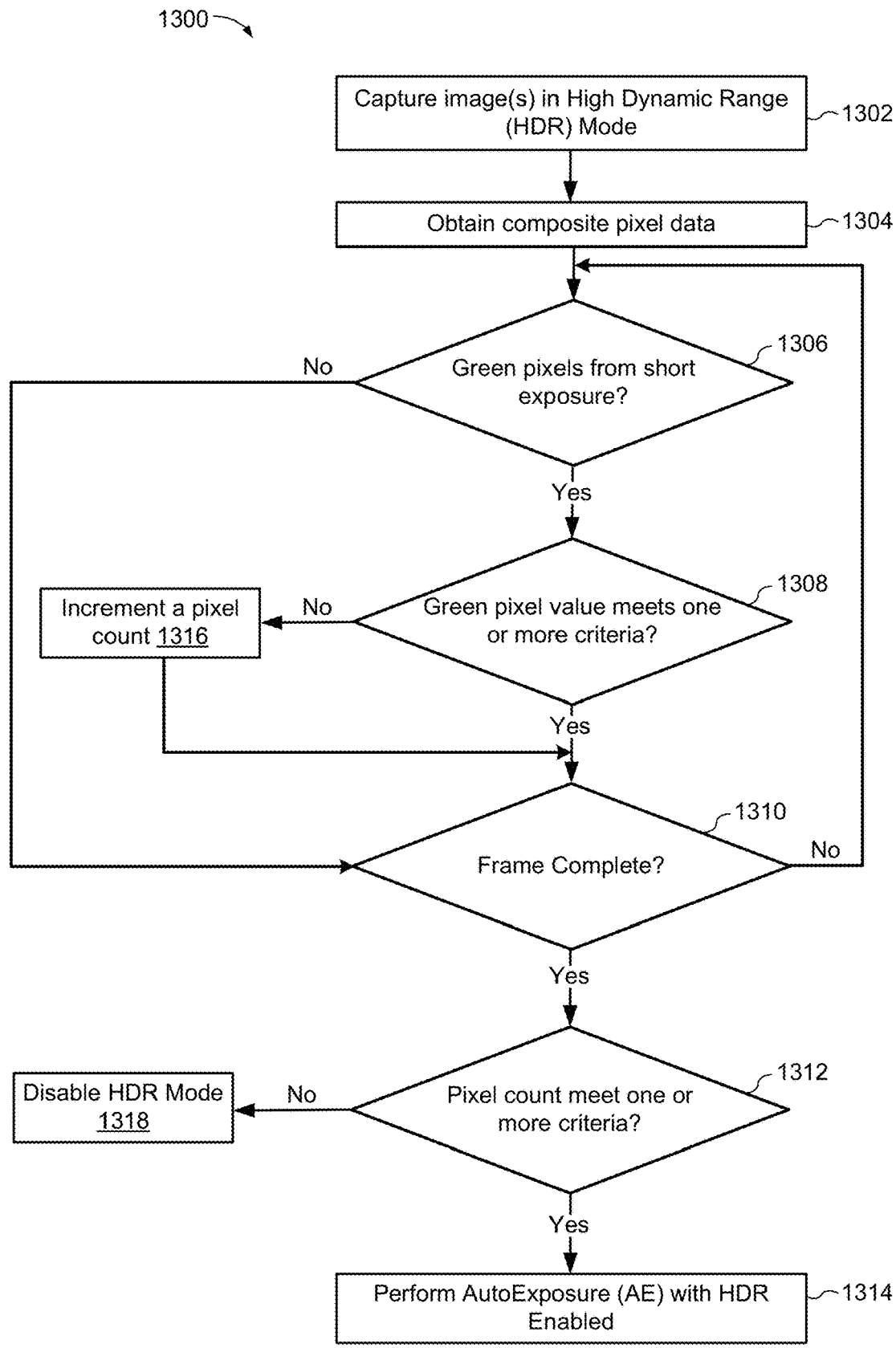
FIG. 12 is a flow diagram illustrating another representative method of disabling a high dynamic range mode in a camera device in accordance with some implementations.

FIG. 12 is a flow diagram illustrating a method 1300 of disabling a high dynamic range mode in a camera device in accordance with some implementations. In some implementations, the method 1300 is performed by a camera device, such as a camera 118, smart doorbell 106, or other camera-equipped smart device 204. In some implementations, the method 1300 performed by components of a smart device 204, such as camera module 444 in conjunction with image sensor(s) 418. In some implementations, the method 1300 is performed at a server system, such as server system 164. In some implementations, the operations of the method 1300 described herein are interchangeable, and respective operations of the method 1300 are performed by any of the aforementioned systems or devices. In some implementations, the method 1300 is governed by instructions that are stored in a non-transitory computer-readable storage medium and that is executed by one or more processors or controllers of a device, such as the processor(s) 402. For convenience, the method 1300 is described below as being performed by a camera device.

The camera device captures (1302) one or more images in a high dynamic range mode. For example, the camera device is a smart device 204 and captures the images via an image sensor 418. As another example, the camera device is a camera device 521 and capture the images via the lens 502 and sensor 504. In some implementations, the camera device comprises a video camera device and captures video data of a scene in a field of view of the camera's image sensor. In some implementations, capturing the image(s) in the HDR mode comprises capturing video data in a staggered HDR mode. In some implementations, the HDR mode is a staggered HDR mode. In some implementations, the operation 1302 is the same as the operation 1002 discussed above.

The camera device obtains (1304) composite pixel data. In some implementations, the composite pixel data includes data for each pixel in a composite image regarding whether the pixel is from the short exposure or long exposure. In some implementations, the composite pixel data includes a light intensity value for each pixel in the composite image.

For each pixel in a frame (1310), the camera device determines (1306) whether the pixel is of a particular color (e.g., green pixels) and whether the pixel originated from a short exposure image. For example, the camera device uses the camera module 444 to make the determinations of color and origin.

In accordance with a determination that the pixel is of the particular color and originated from the short exposure image, the camera device determines (1308) whether the pixel meets one or more criteria. In some implementations, determining whether the pixel meets the one or more criteria includes determining whether a light intensity of the pixel is less than, or optionally equal to, a threshold intensity.

For example, the composite pixel data is optionally gathered during a fusing process. In some implementations, the composite pixel data includes a count the number of green pixels from the short exposure whose value is greater than a threshold. In some implementations, the threshold is a pixel value that qualifies for inclusion in the composite (fused) image.

In accordance with a determination that the pixel does not meet one or more criteria, the camera device increments (1316) a pixel count for the frame. After analyzing the frame, the camera device determines (1312) whether the pixel count meets one or more second criteria. In some implementations, determining whether the pixel count meets the one or more second criteria includes determining whether the pixel count exceeds a count threshold. For example, in accordance with some implementations, the contribution from the short exposure frame should be at least 2%, 5%, 10%, or 15% of the total pixels in the image, less than that, and the short exposure frame is determined to not be adequately contributing to the overall image. In some implementations, all of the pixels of a particular color (e.g., green pixels) from the short exposure frame are evaluated for contribution. For example, one third of the pixels in a raw frame are green, so that is the number of pixels evaluated.

In accordance with a determination that the pixel count meets the one or more second criteria, the camera device performs (1314) automatic exposure with the HDR mode enabled. In some implementations, in accordance with a determination that the pixel count meets the one or more second criteria, the camera device performs the method 1500 of FIGS. 14A-14B.

In accordance with a determination that the pixel count does not meet the one or more second criteria, the camera device disables (1318) the HDR mode. In some implementations, disabling the HDR mode includes determining an exposure time for subsequent frames. In some implementations, the exposure time for subsequent frames is selected based on the long exposure and/or short exposure statistics. In some implementations, the exposure time for subsequent frames is selected based on previously used exposure times.

In some implementations, after disabling the HDR mode, the camera device performs automatic exposure with the HDR mode disabled. For example, the camera performs automatic exposure based on only the short exposure or only the long exposure image. In some implementations, after disabling the HDR mode, the camera device executes an automatic exposure process based on the long and/or short exposure light intensity data (e.g., similar to the method 1500 in FIGS. 14A-14B). In some implementations, after disabling the HDR mode, the camera device performs the method 1400 in FIG. 13.

In some implementations, to switch from the non-HDR mode to the HDR mode, the camera device determines if there is enough dynamic range in the scene to make it worthwhile.

Figure 13:
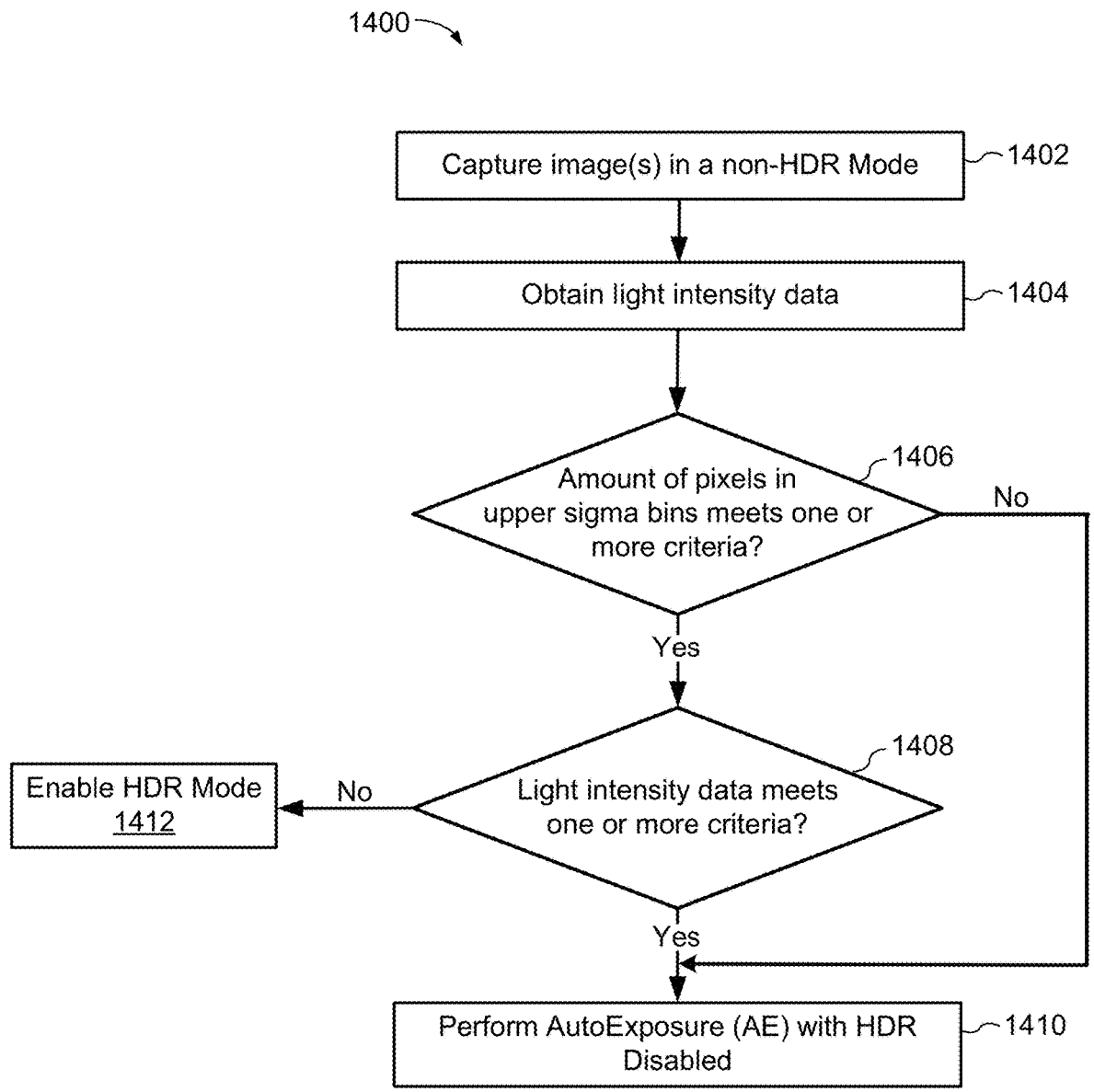
FIG. 13 is a flow diagram illustrating a representative method of enabling a high dynamic range mode in a camera device in accordance with some implementations.

FIG. 13 is a flow diagram illustrating a method 1400 of enabling a high dynamic range mode in a camera device in accordance with some implementations. In some implementations, the method 1400 is performed by a camera device, such as a camera 118, smart doorbell 106, or other camera-equipped smart device 204. In some implementations, the method 1400 performed by components of a smart device 204, such as camera module 444 in conjunction with image sensor(s) 418. In some implementations, the method 1400 is performed at a server system, such as server system 164. In some implementations, the operations of the method 1400 described herein are interchangeable, and respective operations of the method 1400 are performed by any of the aforementioned systems or devices. In some implementations, the method 1400 is governed by instructions that are stored in a non-transitory computer-readable storage medium and that is executed by one or more processors or controllers of a device, such as the processor(s) 402. For convenience, the method 1400 is described below as being performed by a camera device.

The camera device captures (1402) one or more images in a non-HDR mode (e.g., with the HDR mode disabled). For example, the camera device is a smart device 204 and captures the images via an image sensor 418. In some implementations, the camera device captures each image with a single exposure time while in the non-HDR mode.

The camera device obtains (1404) light intensity data for the one or more images. In some implementations, the light intensity data includes an average light intensity for an image and/or light intensity data for each pixel of an image.

The camera device determines (1406) whether an amount of pixels in the upper sigma bins meets one or more first criteria. In some implementations, determining whether the amount of pixels in the upper sigma bins meets the one or more first criteria includes determining whether the amount of pixels exceeds a particular threshold (e.g., as described above with respect to operation 1208).

In accordance with a determination that the amount of pixels in the upper sigma bins meets the one or more first criteria, the camera device determines (1408) whether light intensity data meets one or more second criteria. In some implementations, determining whether the light intensity data meets the one or more second criteria includes determining whether an average light intensity for an image is less than a target light intensity for the image. In some implementations, the order of the operations 1406 and 1408 is reversed.

In accordance with a determination that the light intensity data meets the one or more second criteria, the camera device performs (1410) automatic exposure with the HDR mode disabled.

In accordance with a determination that the light intensity data does not meet the one or more second criteria, the camera device enables (1412) the HDR mode. In some implementations, after enabling the HDR mode the camera device performs the method 1000 in FIG. 9, the method 1100 in FIG. 10, the method 1200 in FIG. 11, or the method 1300 in FIG. 12. In some implementations, when the camera device is a video camera, the camera device enables the HDR mode while the camera device is operating in active or live video mode (e.g., while the camera device is capturing images).

In some implementations, the actual AE process uses a combination of histogram analysis and average light intensity data. In some implementations, a programmable profile is used to determine what order gain, shutter speed, and frame rate should change (e.g., as illustrated in Table 1 below). In some implementations, an exposure ratio table is used to determine what exposure ratio should be used based on upper bin pixel counts (e.g., as illustrated in Table 2 below). In some implementations, the values that serve as limits of operation for a particular exposure ratio are dependent on the statistics gathering method. In some implementations, at initialization, the values of the first row of each table are used.

Figure 14A:
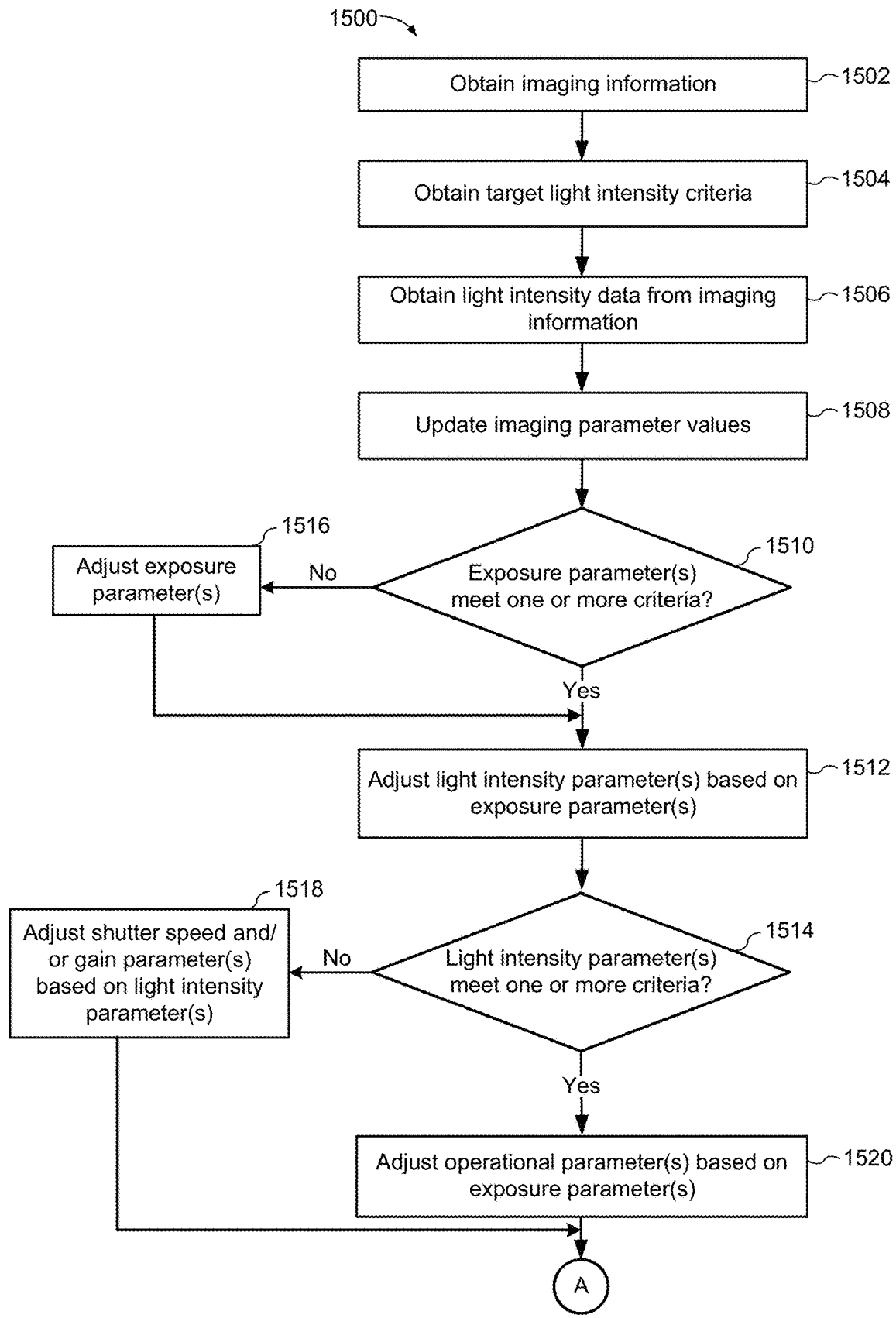
FIGS. 14A-14B are flow diagrams illustrating a representative method of automatically adjusting exposure in a camera device in accordance with some implementations.
Figure 14B:
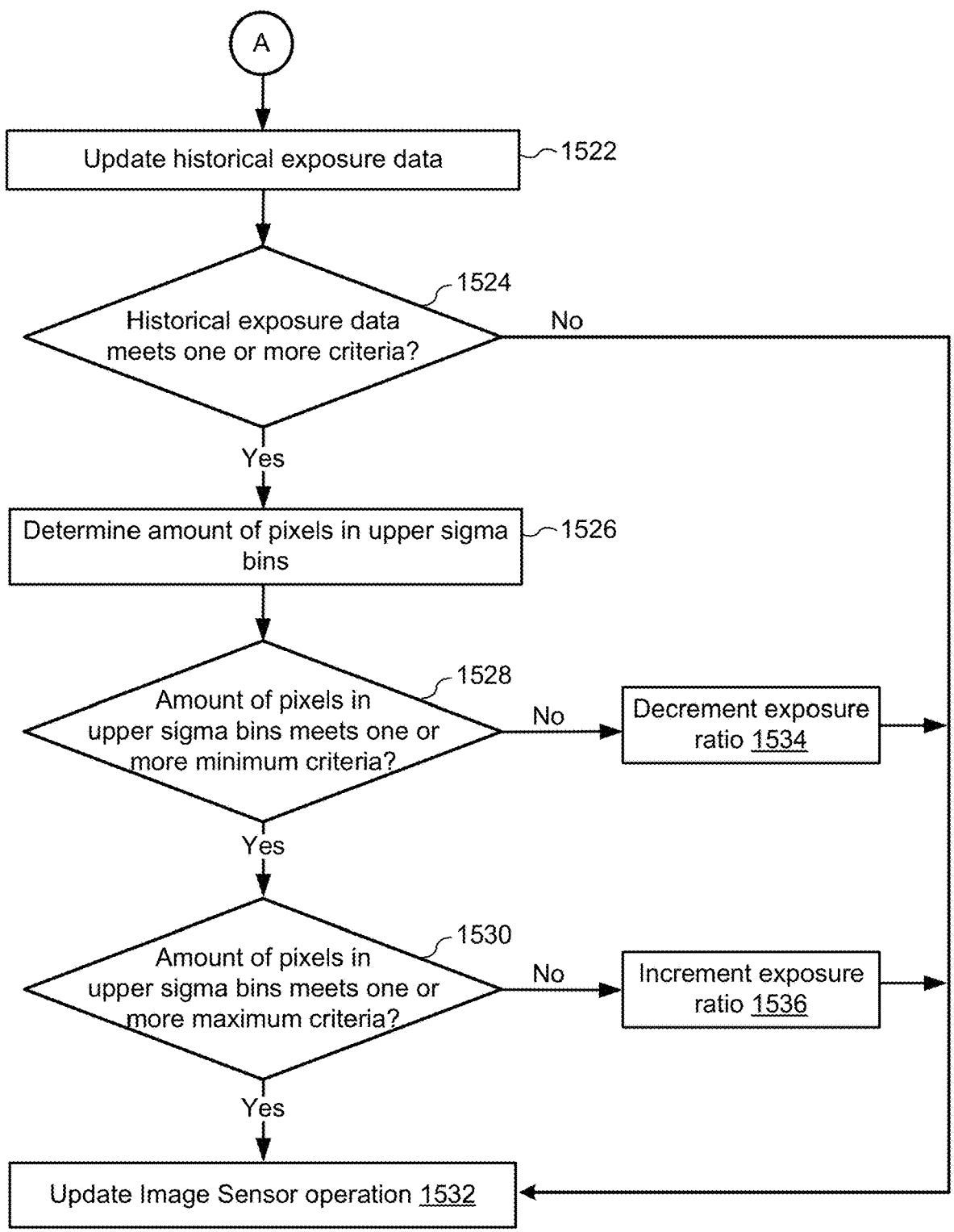

FIGS. 14A-14B are flow diagrams illustrating a method 1500 of automatically adjusting exposure in a camera device in accordance with some implementations. In some implementations, the method of FIGS. 14A-14B is performed by a video camera device concurrently with capturing live video data. In some implementations, the method 1500 is performed by a camera device, such as a camera 118, smart doorbell 106, or other camera-equipped smart device 204. In some implementations, the method 1500 performed by components of a smart device 204, such as camera module 444 in conjunction with image sensor(s) 418. In some implementations, the method 1500 is performed at a server system, such as server system 164. In some implementations, the operations of the method 1500 described herein are interchangeable, and respective operations of the method 1500 are performed by any of the aforementioned systems or devices. In some implementations, the method 1500 is governed by instructions that are stored in a non-transitory computer-readable storage medium and that is executed by one or more processors or controllers of a device, such as the processor(s) 402. For convenience, the method 1500 is described below as being performed by a camera device. In some implementations, the method 1500 is performed after one of the methods 1000, 1100, 1200, and 1300.

In some implementations, while operating in a high dynamic range (HDR) mode, a camera device (e.g., the camera device 501) captures video data of a scene in the field of view of an image sensor (e.g., image sensor 504) of the camera device. In some implementations, capturing the video data of the scene includes capturing a first subset of the video data with a first exposure time; and capturing a second subset of the video data with a second exposure time, lower than the first exposure time.

In some implementations, the camera device combines first video data of the first subset of video data with second video data of the second subset of video data to generate an HDR frame.

The camera device obtains (1502) imaging information. In some implementations, the imaging information includes information corresponding to a short exposure (e.g., a short exposure frame) and information corresponding to a long exposure (e.g., a long exposure frame). In some implementations, the imaging information includes information corresponding to a composite image (e.g., generated from fusion of a short exposure image and long exposure image).

In some implementations, the imaging information includes one or more of: a current exposure ratio, an average light intensity of an image or frame (e.g., corresponding to the short exposure and/or the long exposure), a current exposure value, a current gain, a current shutter speed, a current frames per second setting. In some implementations, the exposure value is initially set to 1. In some implementations, the exposure value is updated per frame. In some implementations, the exposure value is set equal to the previous exposure value multiplied by a ratio of the target light intensity of an image to the average light intensity of the image.

In some implementations, the imaging information includes an index into an automatic exposure profile table (e.g., stored at the camera device). An example AE profile table is shown below in Table 1.

TABLE 1

Example AE profile Table

| Minimum Shutter Speed (sec/exposure) | Maximum Shutter Speed (sec/exposure) | Minimum Gain (dB) | Maximum Gain (dB) | Frames per Second | Minimum Exposure Value | Maximum Exposure Value |
|---|---|---|---|---|---|---|
| 1/6000 | 1/60 | 0 | 0 | 30 | 1 | 100 |
| 1/60 | 1/30 | 0 | 6 | 30 | 100 | 400 |
| 1/30 | 1/30 | 3 | 12 | 30 | 150 | 800 |
| 1/15 | 1/15 | 3 | 30 | 15 | 400 | 6400 |
| 1/7 | 1/7 | 9 | 36 | 7.5 | 2400 | 24000 |

In some implementations, as exposure value targets are determined, the table is traversed up or down based on calculated exposure value. In some implementations, the table has hysteresis built into it around frame rate changes to avoid beating. In some implementations, hysteresis is achieved by making the maximum gain value of one row greater than the minimum gain value of the next row.

The camera device obtains (1504) one or more target light intensity criteria. In some implementations, the one or more target light intensity criteria include one or more of: a target exposure value, a target light intensity for an image, a target light intensity for an image pixel. In some implementations, the camera device obtains the one or more target light intensity criteria before obtaining the imaging information. In some implementations, a target light intensity for the image is based on the current exposure ratio of the camera device. In some implementations, obtaining the target light intensity for the image includes obtaining the target light intensity from a table based on the exposure ratio (e.g., Table 2 below).

TABLE 2

Example Target Light Intensity Table

| Target Light Intensity | Exposure Ratio |
|---|---|
| 2300 | 4 |
| 2250 | 5 |
| 2200 | 6 |
| 2150 | 7 |
| 2100 | 8 |
| 2050 | 9 |
| 2050 | 10 |
| 2050 | 11 |
| 2050 | 12 |
| 2050 | 13 |

The camera device obtains (1506) light intensity data from the imaging information. In some implementations, the light intensity data includes an average light intensity for an image. In some implementations, the light intensity data includes a light intensity value for each pixel in the image.

The camera device updates (1508) one or more imaging parameter values. In some implementations, the camera device maintains a parameter for one or more of: exposure ratio, exposure value, gain, shutter speed, frames per second. In some implementations, updating the imaging parameter value(s) includes replacing previous values with values from the imaging information (e.g., values from the current image or frame).

The camera device determines (1510) whether one or more exposure parameters meet one or more first criteria. In some implementations, determining whether the one or more exposure parameters meet the one or more first criteria includes determining whether a difference between a current exposure value and a previous exposure value is greater than an adaptation speed for the camera device. In some implementations, the adaptation speed is equivalent to a maximum exposure value change for a given frame. In some implementations, the adaptation speed is based on an automatic exposure closure speed.

In accordance with a determination that the one or more exposure parameters do not meet the one or more first criteria, the camera device adjusts (1516) the one or more exposure parameters. In some implementations, adjusting the exposure parameter(s) includes adjusting an exposure value. In some implementations, adjusting the exposure value includes setting the exposure value equal to the previous exposure value plus or minus the adaptation speed (e.g., the exposure value is scaled up or down to limit it to the adaptation speed).

In accordance with a determination that the one or more exposure parameters meet the one or more first criteria, the camera device adjusts (1512) one or more light intensity parameters based on the one or more exposure parameters. In some implementations, adjusting the one or more light intensity parameters based on the one or more exposure parameters includes adjusting an index into an AE profile table based on a current exposure value and the maximum and minimum exposure values in the AE profile table. For example, the light intensity parameter(s) include an index indicating the first row of Table 1 above and the current exposure value is 102. In this example the index is updated to indicate the second row of Table since the current exposure value of 102 is between 100 and 400.

After adjusting the light intensity parameter(s), the camera device determines (1514) whether the adjusted light intensity parameter(s) meet one or more second criteria. In some implementations, determining whether the adjusted light intensity parameter(s) meet the one or more second criteria includes determining whether the current exposure value required changing an index into the AE profile table.

In some implementations, the camera determines whether a light intensity of the captured video data meets one or more intensity criteria; and, in accordance with a determination that the light intensity does not meet the one or more intensity criteria, adjusts one or more of: a shutter speed of the camera device; a gain of the camera device; and a frame rate of the camera device. In some implementations, the one or more intensity criteria are based on a current ratio of the first exposure time and the second exposure time.

In accordance with a determination that the one or more light intensity parameters do not meet the one or more second criteria, the camera device adjusts (1518) shutter speed and/or gain parameters based on the light intensity parameters. In some implementations, the shutter speed and gain parameters are adjust based on the AE profile table (e.g., are adjusted within the bounds set by the AE profile table based on the current index). In some implementations, the shutter speed is adjusted first and the gain is adjusted second, if needed.

In accordance with a determination that the one or more light intensity parameters meet the one or more second criteria, the camera device adjusts (1520) operational parameter(s) based on the exposure parameter(s). In some implementations, adjusting the shutter speed and/or gain parameter(s) based on the exposure parameter(s) includes: (1) determining whether the current frames per second setting is equal to the previous frames per second setting; (2) in accordance with a determination that the current frames per second is equal to the previous frames per second, determining whether the current shutter speed is equal to the minimum shutter speed for the corresponding row of the AE profile table; (3) in accordance with a determination that the current shutter speed is equal to the minimum shutter speed, adjusting the gain based on the current gain and the ratio of the current exposure value to the previous exposure value; and (4) in accordance with a determination that the current frames per second setting is different from the previous frames per second setting, or in accordance with a determination that the current shutter speed is different from the minimum shutter speed, adjusting the fame rate and/or gain based on the corresponding AE profile table row.

The camera device updates (1522) historical exposure data. In some implementations, updating the historical exposure data includes updating an automatic exposure history table to include one or more of: current gain, shutter speed, exposure ratio, and frames per second settings.

The camera device determines (1524) whether the updated historical exposure data meets one or more third criteria. In some implementations, determining whether the updated historical exposure data meets the one or more third criteria includes determining whether one or more of: shutter speed, gain, frame rate, and exposure ratio have changed recently (e.g., within the past 1, 10, or 20 frames). In some implementations, determining whether the updated historical exposure data meets the one or more third criteria includes determining whether an exposure ratio delay has been meet (e.g., has a set number of frames, such as 5, 10, or 20, been captured since the most recent exposure ratio adjustment).

In accordance with a determination that the updated historical exposure data meets the one or more third criteria, the camera device determines (1526) an amount of pixels in the upper sigma bins (e.g., as described above with respect to operation 1208).

The camera device determines (1528) whether an amount of pixels in the upper sigma bins meets one or more minimum criteria. In accordance with a determination that the amount of pixels in the upper sigma bins does not meet the one or more minimum criteria, the camera device decrements (1534) the exposure ratio. For example, the number of pixels in the upper sigma bins is less than a minimum pixel threshold and the exposure ratio is adjusted from 1:8 to 1:7. In some implementations, in accordance with the determination that the amount of pixels in the upper sigma bins does not meet the one or more minimum criteria, the camera device adjusts the exposure ratio based on an exposure ratio table, such as Table 2 below.

TABLE 3

Example Exposure Table

| Minimum Pixel Count | Maximum Pixel Count | Sigma Bins | Ratio |
|---|---|---|---|
| 0 | 200,000 | 40 | 4 |
| 75,000 | 200,000 | 32 | 5 |
| 100,000 | 250,000 | 27 | 6 |
| 100,000 | 250,000 | 23 | 7 |
| 50,000 | 270,000 | 20 | 8 |
| 100,000 | 250,000 | 18 | 9 |
| 100,000 | 2,500,000 | 12 | 13 |

In some implementations, the exposure ratio is programmable and dependent on scene, exposure, gain and frame rate. In some implementations, the exposure ratio is determined based on the upper bins of a light intensity histogram for an image, and using an exposure ratio table (e.g., Table 3 above) to determine the next setting.

In some implementations, the minimum pixel count and maximum pixel count in Table 3 are thresholds on the number of pixels found in sigma bins, either at the top of the histogram or the bottom of the histogram.

In some implementations, the minimum pixel count and maximum pixel count in Table 3 are thresholds for the particular exposure ratio. In some implementations, the sigma bins in Table 3 is the number of histogram bins to use to create the sum of pixels used to evaluate current frame with respect to the minimum pixel count and maximum pixel count. In some implementations, sigma bins, the minimum pixel count, and maximum pixel count are tunable parameters.

In accordance with a determination that the amount of pixels in the upper sigma bins meets the one or more minimum criteria, the camera device determines (1530) whether an amount of pixels in the upper sigma bins meets one or more maximum criteria or minimum criteria. In some implementations, the order of operations 1528 and 1530 are reversed.

In accordance with a determination that the amount of pixels in the upper sigma bins does not meet the one or more maximum criteria, the camera device increments (1536) the exposure ratio. For example, the number of pixels in the upper sigma bins is greater than a maximum pixel threshold and the exposure ratio is adjusted from 1:8 to 1:9.

In some implementations, the camera device adjusts a duration of at least one of the first exposure time and the second exposure time based on one or more parameters of the captured video data, thereby altering a ratio of the first exposure time to the second exposure time. In some implementations, adjusting the duration of at least one of the first exposure time and the second exposure time includes: (1) binning pixels of the captured video data by light intensity (e.g., for a particular color); (2) determining whether a number of pixels in one or more boundary bins meets a minimum pixel count criterion; and (3) in accordance with a determination that the number of pixels in the one or more boundary bins does not meet the minimum pixel count criterion, determining an updated ratio for the first and second exposure times.

In some implementations, adjusting the duration of at least one of the first exposure time and the second exposure time comprises selecting a second ratio from a stored list of predefined ratios (e.g., selected from Table 3 above). In some implementations, the adjusting of the duration of at least one of the first exposure time and the second exposure time is based on parameters of a plurality of generated HDR frames (e.g., a comparison of changes between two frames).

In some implementations, the camera device: (1) adjusts an intensity criterion based on the adjusted ratio; (2) captures second video data of the scene; and (3) in accordance with a determination that a light intensity of the second video data does not meet the adjusted intensity criterion, adjusting one or more of: (a) a shutter speed of the camera device; (b) a gain of the camera device; and (c) a frame rate of the camera device.

In accordance with a determination that the amount of pixels in the upper sigma bins meets the one or more maximum criteria or after incrementing/decrementing the exposure ratio, the camera device updates (1532) the image sensor operation. In some implementations, after updating the image sensor operation, the camera device proceeds with capturing image(s) using the updated parameters (e.g., updated shutter speed, gain, exposure ratio, and etc.).

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first category could be termed a second category, and, similarly, a second category could be termed a first category, without departing from the scope of the various described implementations. The first category and the second category are both categories, but they are not necessarily the same category.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method performed at a video camera device having memory, one or more processors, and an image sensor, the method comprising:
   while operating in a high dynamic range-mode (HDR-mode):
     capturing a first subset of video data with a first exposure time; and
     capturing a second subset of the video data with a second exposure time that is lower than the first exposure time;
   combining the first subset of the video data and the second subset of the video data to generate an HDR frame;
   determining that an exposure ratio meets one or more first criteria; and
   based on the exposure ratio meeting the one or more first criteria, operating the video camera device in a non-HDR mode.

2. The method of claim 1, wherein the determining that an exposure ratio meets one or more first criteria comprises:
   obtaining composite light intensity data from the first subset of the video data and the second subset of the video data.

3. The method of claim 2, wherein the composite light intensity data includes one or more of:
   a number of pixels above a threshold amount of light intensity;
   a current exposure ratio; or
   an average light intensity of the composite light intensity data.

4. The method of claim 3, wherein the obtaining the composite light intensity data from the first subset of the video data and the second subset of the video data comprises:
   obtaining light intensity for multiple tiled regions of the HDR frame.

5. The method of claim 3, wherein the composite light intensity data is the average light intensity of the composite light intensity data, the method comprising:
   obtaining the average light intensity using one or more weighted matrices.

6. The method of claim 5, wherein the one or more weighted matrices include:
   a center-weighted matrix;
   a matrix weighted for one or more regions where motion is present; or
   a matrix weighted for one or more zones of interest.

7. The method of claim 1, further comprising:
   based on the exposure ratio not meeting the one or more first criteria, determining that an amount of pixels in upper sigma bins meet one or more second criteria;
   based on the amount of pixels in the upper sigma bins not meeting the one or more second criteria, operating the video camera device in the non-HDR mode;
   based on the amount of pixels in the upper sigma bins meeting the one or more second criteria, determining that a light intensity average meets one or more third criteria;
   based on the light intensity average meeting the one or more third criteria, operating the video camera device in the non-HDR mode; and
   based on the light intensity average not meeting the one or more third criteria, performing automatic exposure in the HDR-mode.

8. The method of claim 7, wherein the one or more first criteria includes determining whether the exposure ratio is set to or below a minimum ratio threshold.

9. The method of claim 7, wherein the determining that the amount of pixels in upper sigma bins meet one or more second criteria comprises:
   determining that the amount of pixels in upper sigma bins exceeds a threshold for a number of pixels in an uppermost bin; or
   comparing the amount of pixels in upper sigma bins to an amount of pixels in lower sigma bins.

10. The method of claim 7, wherein the determining that the light intensity average meets one or more third criteria comprises:
    determining whether the light intensity average is less than or equal to a target light intensity.

11. The method of claim 1 wherein the operating the video camera device in a non-HDR mode comprises:
    determining an exposure time for subsequent frames.

12. A video camera device, comprising:
    one or more processors;
    an image sensor;
    memory comprising instructions executable by the one or more processors to configure the video camera device to:
      while operating in a high dynamic range-mode (HDR-mode):
        capture a first subset of video data with a first exposure time; and
        capture a second subset of the video data with a second exposure time that is lower than the first exposure time;
      combine the first subset of the video data and the second subset of the video data to generate an HDR frame;
      determine that an exposure ratio meets one or more first criteria; and
      based on the exposure ratio meeting the one or more first criteria, operate the video camera device in a non-HDR mode.

13. The video camera device of claim 12, the instructions to determine that an exposure ratio meets one or more first criteria are executable by the one or more processors to configure the video camera device to:
    obtain composite light intensity data from the first subset of the video data and the second subset of the video data.

14. The video camera device of claim 13, wherein the composite light intensity data includes one or more of:
    a number of pixels above a threshold amount of light intensity;
    a current exposure ratio; or
    an average light intensity of the composite light intensity data.

15. The video camera device of claim 14, wherein the instructions executable by the one or more processors to configure the video camera device to obtain the composite light intensity data from the first subset of the video data and the second subset of the video data configure the video camera device to:

obtain light intensity for multiple tiled regions of the HDR frame.

16. The video camera device of claim 14, wherein the composite light intensity data is the average light intensity of the composite light intensity data, the instructions further executable by the one or more processors to configure the video camera device to:

obtain the average light intensity using one or more weighted matrices.

17. The video camera device of claim 16, wherein the one or more weighted matrices include:

a center-weighted matrix;
a matrix weighted for one or more regions where motion is present; or
a matrix weighted for one or more zones of interest.

18. The video camera device of claim 12, wherein the instructions are further executable by the one or more processors to configure the video camera device to:

based on the exposure ratio meeting the one or more first criteria, operate the video camera device in a non-HDR mode;
based on the exposure ratio not meeting the one or more first criteria,
determine that an amount of pixels in upper sigma bins meet one or more second criteria;
based on the amount of pixels in the upper sigma bins not meeting the one or more second criteria, operate the video camera device in the non-HDR mode;
based on the amount of pixels in the upper sigma bins meeting the one or more second criteria, determine that a light intensity average meets one or more third criteria;
based on the light intensity average meeting the one or more third criteria, operate the video camera device in the non-HDR mode; and
based on the light intensity average not meeting the one or more third criteria, perform automatic exposure in the HDR-mode.

19. The video camera device of claim 18, wherein the instructions executable by the one or more processors to determine that the amount of pixels in upper sigma bins meet one or more second criteria configure the video camera device to:

determine that the amount of pixels in upper sigma bins exceeds a threshold for a number of pixels in an uppermost bin; or
compare the amount of pixels in upper sigma bins to an amount of pixels in lower sigma bins.

20. The video camera device of claim 12 wherein the instructions executable by the one or more processors to operate the video camera device in a non-HDR mode configure the video camera device to:

determine an exposure time for subsequent frames.

* * * * *